(12) United States Patent
Fichter et al.

(10) Patent No.: US 10,600,089 B2
(45) Date of Patent: Mar. 24, 2020

(54) SYSTEM AND METHOD TO MEASURE EFFECTIVENESS AND CONSUMPTION OF EDITORIAL CONTENT

(71) Applicant: Oracle America, Inc., Redwood Shores, CA (US)

(72) Inventors: Daniel E. Fichter, New York, NY (US); Christopher R. Tsoufakis, Salt Lake City, UT (US); Nikki K. Gomez, Brooklyn, NY (US); Aniq Rahman, New York, NY (US); Jonah Goodhart, New York, NY (US); Michael Garrett Seiler, Scarsdale, NY (US); Suryansh Agarwal, West Orange, NJ (US); Theodore V. McConnell, Cincinnati, OH (US)

(73) Assignee: Oracle America, Inc., Redwood Shores, CA (US)

( * ) Notice: Subject to any disclaimer, the term of this patent is extended or adjusted under 35 U.S.C. 154(b) by 385 days.

(21) Appl. No.: 14/213,360

(22) Filed: Mar. 14, 2014

(65) Prior Publication Data
US 2017/0316092 A1    Nov. 2, 2017

Related U.S. Application Data

(60) Provisional application No. 61/785,921, filed on Mar. 14, 2013.

(51) Int. Cl.
*G06Q 30/02* (2012.01)
*G06F 16/954* (2019.01)
*G06F 16/958* (2019.01)

(52) U.S. Cl.
CPC ....... *G06Q 30/0277* (2013.01); *G06F 16/954* (2019.01); *G06F 16/958* (2019.01); *G06Q 30/0254* (2013.01); *G06Q 30/0255* (2013.01)

(58) Field of Classification Search
CPC ............. G06F 17/3089; G06F 16/958; G06Q 30/0276; G06Q 30/0255; G06Q 30/0254; G06Q 30/0269
See application file for complete search history.

(56) References Cited

U.S. PATENT DOCUMENTS

| | | | |
|---|---|---|---|
| 6,108,637 | A | 8/2000 | Blumenau |
| 6,115,680 | A | 9/2000 | Coffee et al. |

(Continued)

FOREIGN PATENT DOCUMENTS

CN    102253820    11/2011

OTHER PUBLICATIONS

Tinic Ura "Timing it right" http://www.kaourantin.net/2010/03/timing-it-right.html (Year: 2010), 3 pp.

(Continued)

*Primary Examiner* — Marc S Somers
(74) *Attorney, Agent, or Firm* — Kilpatrick Townsend & Stockton LLP

(57) ABSTRACT

A system for analyzing user consumption of content on web pages or determining user engagement with content comprising a data collection script and an content-engagement-inference engine. The data collection script determines one or more content elements to be measured from a web page and collects description data associated with the one or more content elements. The description data describes information about the one or more content elements. The content-engagement-inference engine creates an inference or analytics result based on the description data. The inference or analytics result describes how the one or more content elements have been consumed by users and then provides the inference or analytics result for users to designated entities.

21 Claims, 12 Drawing Sheets

(56) References Cited

U.S. PATENT DOCUMENTS

| | | | |
|---|---|---|---|
| 6,151,608 A | 11/2000 | Abrams | |
| 6,230,204 B1 | 5/2001 | Fleming, III | |
| 6,327,619 B1 | 12/2001 | Blumenau | |
| 6,418,470 B2 | 7/2002 | Blumenau | |
| 6,778,982 B1 | 8/2004 | Knight et al. | |
| 7,263,497 B1 | 8/2007 | Niser et al. | |
| 7,310,609 B2 | 12/2007 | Middleton, III et al. | |
| 7,386,473 B2 | 6/2008 | Blumenau | |
| 7,613,635 B2 | 11/2009 | Blumenau | |
| 7,620,624 B2 | 11/2009 | Stata et al. | |
| 7,660,737 B1 | 2/2010 | Lim | |
| 7,716,326 B2 | 5/2010 | Blumenau | |
| 7,756,974 B2 | 7/2010 | Blumenau | |
| 7,917,755 B1* | 3/2011 | Giliyaru | G06F 17/2211 382/181 |
| 8,108,245 B1* | 1/2012 | Hosea | G06Q 30/02 705/14.49 |
| 8,190,604 B2 | 5/2012 | Wen et al. | |
| 8,255,491 B1 | 8/2012 | Arzur | |
| 8,266,115 B1 | 9/2012 | Park | |
| 8,386,314 B2 | 2/2013 | Kirkby et al. | |
| 8,508,532 B1* | 8/2013 | Logan | G06F 17/211 345/440 |
| 8,544,050 B2 | 9/2013 | Brown | |
| 8,554,938 B2 | 10/2013 | Mittal | |
| 8,666,989 B1 | 3/2014 | Gilliam et al. | |
| 8,799,103 B1* | 8/2014 | Federighi | G06Q 10/08 705/26.25 |
| 8,880,996 B1* | 11/2014 | Deshpande | G06Q 30/0255 715/234 |
| 9,282,048 B1 | 3/2016 | Fichter et al. | |
| 2002/0098891 A1 | 7/2002 | Graham et al. | |
| 2002/0103698 A1 | 8/2002 | Cantrell | |
| 2002/0111865 A1 | 8/2002 | Middleton, III | |
| 2002/0138331 A1* | 9/2002 | Hosea | G06F 17/30905 705/7.37 |
| 2002/0165773 A1 | 11/2002 | Natsuno et al. | |
| 2003/0122966 A1 | 7/2003 | Markman et al. | |
| 2003/0200145 A1 | 10/2003 | Krassner et al. | |
| 2005/0210533 A1 | 9/2005 | Copeland et al. | |
| 2005/0235030 A1 | 10/2005 | Lauckhart et al. | |
| 2006/0026063 A1 | 2/2006 | Collins | |
| 2006/0080681 A1 | 4/2006 | Anwar et al. | |
| 2007/0039018 A1 | 2/2007 | Saslow et al. | |
| 2007/0050251 A1 | 3/2007 | Jain et al. | |
| 2007/0067267 A1* | 3/2007 | Ives | G06F 17/30864 707/3 |
| 2007/0255702 A1 | 11/2007 | Orme | |
| 2007/0266305 A1 | 11/2007 | Cong et al. | |
| 2008/0004958 A1 | 1/2008 | Ralph et al. | |
| 2008/0114709 A1 | 5/2008 | Dixon | |
| 2008/0120165 A1 | 5/2008 | Yan | |
| 2008/0320125 A1 | 12/2008 | O'Sullivan et al. | |
| 2009/0076899 A1 | 3/2009 | Gbodimowo | |
| 2009/0150500 A1 | 6/2009 | Kumar et al. | |
| 2009/0157813 A1 | 6/2009 | Jung et al. | |
| 2009/0187546 A1 | 7/2009 | Hamilton Whyte | |
| 2009/0216621 A1 | 8/2009 | Anderson | |
| 2009/0228433 A1 | 9/2009 | Aguilar Saborit et al. | |
| 2009/0265243 A1 | 10/2009 | Karassner et al. | |
| 2009/0271260 A1 | 10/2009 | Sharma et al. | |
| 2009/0300528 A1 | 12/2009 | Stambaugh | |
| 2010/0023868 A1* | 1/2010 | Bonforte | G06Q 10/06 715/738 |
| 2010/0095317 A1 | 4/2010 | Toebes et al. | |
| 2010/0121676 A1* | 5/2010 | Jackson | G06Q 30/0203 705/7.32 |
| 2010/0146380 A1 | 6/2010 | Rousso et al. | |
| 2010/0153996 A1 | 6/2010 | Migos et al. | |
| 2010/0169792 A1 | 7/2010 | Ascar et al. | |
| 2010/0198697 A1 | 8/2010 | Brown | |
| 2010/0241597 A1* | 9/2010 | Chen | G06Q 30/02 706/12 |
| 2010/0251128 A1 | 9/2010 | Cordasco | |
| 2010/0287054 A1 | 11/2010 | Zohar et al. | |
| 2010/0293031 A1 | 11/2010 | Jacobs et al. | |
| 2010/0295774 A1 | 11/2010 | Hennessey | |
| 2010/0310175 A1 | 12/2010 | Holt | |
| 2011/0029393 A1 | 2/2011 | Apprendi et al. | |
| 2011/0072131 A1 | 3/2011 | Zohar et al. | |
| 2011/0087966 A1* | 4/2011 | Leviathan | G06F 17/30905 715/745 |
| 2011/0125587 A1 | 5/2011 | Netzer et al. | |
| 2011/0137737 A1 | 6/2011 | Baird et al. | |
| 2011/0163971 A1 | 7/2011 | Wagner et al. | |
| 2011/0239243 A1 | 9/2011 | Dierks et al. | |
| 2011/0246267 A1 | 10/2011 | Williams et al. | |
| 2011/0246879 A1* | 10/2011 | White | G06F 17/3089 715/704 |
| 2011/0307659 A1 | 12/2011 | Hans et al. | |
| 2011/0320286 A1 | 12/2011 | Zohar | |
| 2012/0078707 A1 | 3/2012 | Ramakrishnan et al. | |
| 2012/0106793 A1 | 5/2012 | Gershenson et al. | |
| 2012/0239489 A1 | 9/2012 | Peretti et al. | |
| 2012/0284738 A1 | 11/2012 | Narasimhan et al. | |
| 2012/0317472 A1* | 12/2012 | Chernysh | G06F 17/2229 715/234 |
| 2012/0324098 A1 | 12/2012 | De Jager et al. | |
| 2013/0031470 A1* | 1/2013 | Daly, Jr. | G06F 17/30893 715/243 |
| 2013/0124342 A1 | 5/2013 | Virkar et al. | |
| 2013/0145384 A1 | 6/2013 | Krum et al. | |
| 2013/0173765 A1 | 7/2013 | Korbecki | |
| 2013/0179767 A1 | 7/2013 | Bajric et al. | |
| 2013/0205314 A1 | 8/2013 | Ramaswamy et al. | |
| 2013/0238423 A1 | 9/2013 | Pottjegort | |
| 2013/0318051 A1 | 11/2013 | Kumar et al. | |
| 2013/0335576 A1 | 12/2013 | Gotschlich | |
| 2014/0040786 A1* | 2/2014 | Swanson | G06F 17/30899 715/760 |
| 2014/0108562 A1 | 4/2014 | Panzer | |
| 2014/0181634 A1* | 6/2014 | Compain | G06F 17/24 715/234 |
| 2014/0278993 A1 | 9/2014 | Massoudi et al. | |
| 2014/0282642 A1 | 9/2014 | Needham et al. | |
| 2015/0066940 A1 | 3/2015 | Fernandes et al. | |
| 2017/0316455 A1 | 11/2017 | Fichter et al. | |
| 2017/0316462 A1 | 11/2017 | Mcconnell et al. | |
| 2017/0316466 A1 | 11/2017 | Goodhart et al. | |
| 2017/0316467 A1 | 11/2017 | Seiler et al. | |
| 2017/0318339 A1 | 11/2017 | Fichter et al. | |

OTHER PUBLICATIONS

Adobe Flash Platform "Minimizing CPU usage" Oct. 18, 2010 https://web.archive.org/web/20111018064811/http://help.adobe.com/en_US/as3/mobile/WS4bebcd66a74275c36cfb8137124318eebc6-8000.html, 9 pp.

U.S. Appl. No. 13/945,851 Received a Non-Final Office Action dated Apr. 9, 2015, 11 pages.

U.S. Appl. No. 13/945,851 Received a Final Office Action dated Jan. 15, 2017, 22 pages.

U.S. Appl. No. 13/945,851 Received a Non-Final Office Action dated Jun. 30, 2017, 18 pages.

U.S. Appl. No. 13/945,851 Received a Final Office Action dated Feb. 23, 2018, 12 pages.

U.S. Appl. No. 14/032,019 Received a Non-Final Office Action dated Oct. 7, 2015, 13 pages.

U.S. Appl. No. 14/032,019 Received a Final Office Action dated May 9, 2016, 19 pages.

U.S. Appl. No. 14/032,019 Received a Non-Final Office Action dated Aug. 16, 2017, 15 pages.

U.S. Appl. No. 14/213,443, Final Office Action dated Mar. 22, 2019, 33 pages.

U.S. Appl. No. 14/032,019 received a Final Office Action dated Jun. 29, 2018, all pages.

U.S. Appl. No. 14/213,443 received a Non Final Office Action dated Sep. 21, 2018, 20 pages.

U.S. Appl. No. 14/213,443 received a Final Office Action dated Jun. 20, 2017, 23 pages.

(56) References Cited

OTHER PUBLICATIONS

U.S. Appl. No. 14/213,443 received a Final Office Action dated Dec. 1, 2015, 15 pages.
U.S. Appl. No. 14/213,443 received a Non-Final Office Action dated Nov. 30, 2016, 21 pages.
U.S. Appl. No. 14/213,443 received a Non-Final Office Action dated Feb. 23, 2015, 18 pages.
U.S. Appl. No. 13/945,851 received a Non Final Office Action dated Sep. 10, 2018, all pages.
Welovead, "Welovead beta", Web Design Served, Behance Served Sites, May 19, 2010, all pages, retrieved from http://www.webdesingserved.com/gallery/WELOVEAD-beta/517362.
Welovead, "Upload an Ad, Be One of 60K Adverts", We Love Ad, Creative Adverts Database, Mar. 7, 2011, all pages, retrieved from: http://web.archive.org/web/20110307041600/http://www.welovead/com/ed/works/database.
U.S. Appl. No. 13/945,851, Final Office Action dated Apr. 25, 2019, 16 pages.
U.S. Appl. No. 14/032,019, Non-Final Office Action dated May 2, 2019, 13 pages.

* cited by examiner

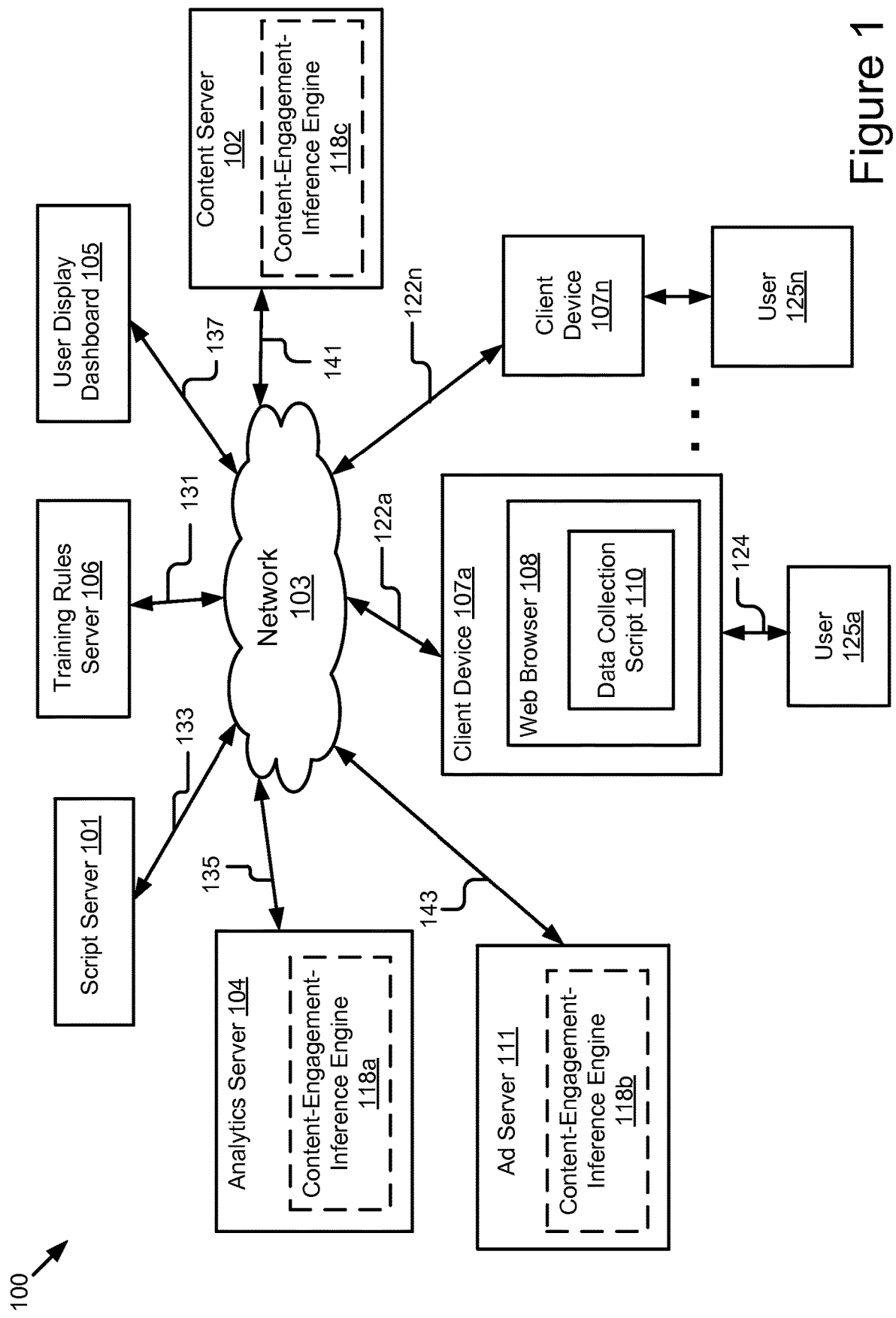

User-Behavior Determination Module
208

Example metrics use: Cursor Movement, Scrolling Behavior, Scrolling Velocity, Scrolling Direction, Comments, Sharing, Navigation, Time Spent, etc.

Content Structure Determination Module
210

Example metrics use: Headlines, Photo within a frame, Content Boundary, etc.

Content Tool Module
212

Example metrics used: Content Boundary, Content Type, Div Tags, Browser Type, Re-sizing Screen Action, etc.

Figure 2B

SYSTEM AND METHOD TO MEASURE EFFECTIVENESS AND CONSUMPTION OF EDITORIAL CONTENT

CROSS-REFERENCE TO RELATED APPLICATIONS

The present application claims the benefit under 35 U.S.C. § 119(e) of U.S. Provisional Application Ser. No. 61/785,921, entitled "System and Method to Measure Effectiveness and Consumption of Editorial Content" filed on Mar. 14, 2013, the entire contents of which are incorporated herein by reference.

BACKGROUND OF THE INVENTION

1. Field of the Invention

The present invention relates to measurement of on-line content consumption or user engagement with online content. In particular, the present invention relates to computer systems and methods for collecting and analyzing user consumption of content on web pages, by gathering measurements of user and media behavior, from a browser displaying a web page, to infer aspects of user attention to content on the web page that is viewed.

2. Description of the Related Art

The Internet and other types of on-line communication have become increasingly popular to the point where they now compete with traditional media such as print media and broadcast media for the attention of users. Due to the large number of web pages available or viewing by users worldwide, creation and publication of online content have become a huge business. It is invariably the goal of publishers to attract users to read or consume their content. It has been widely understood that the economic value of online content, whether it is used to provide context for advertising or to disseminate information is therefore proportional to the extent to which the content is consumed by users.

The existing ways and means to discover or measure the extent to which the content is either read, viewed, or consumed by users are very few and inaccurate. For example, a user visit to a web page is often used by the existing methods as a surrogate measure for the consumption of the content on that web page. However, this is a poor measure because it provides no indication of which content on the web page was consumed by the user and to what extent the content on the web page was actually consumed. In other words, the existing methods using this measure are problematic and deficient.

One major drawback with the existing methods is that they cannot detect which content on the web pages was actually consumed by users. For example, even with knowing that a user has visited a web page, the existing methods are still not able to ascertain which content on the web page was actually consumed by the user, e.g., which articles, videos, or audios the user viewed, watched, or listened to.

As another related drawback, the existing methods are incapable of revealing to what extent the content on the web page was consumed, e.g., a determination by percentage of the extent of a particular article read by a particular, how deeply the article was read by the particular user, or how fast the user read the article, etc. Without determining indicators such as these, the existing systems are not able to help the publishers to evaluate their content and therefore, to improve their content.

SUMMARY OF THE INVENTION

In one innovative aspect, the present invention provides a system for analyzing user consumption of content on web pages or user engagement with online content, by gathering measurements reflecting user and media behavior, from a browser displaying a web page, to infer aspects of user attention to content on the web page that is viewed. The system comprises a script server (or an ad server or a content server) and an analytics engine. The script server (or an ad server or a content server) places a data collection script on a browser of the web pages. The data collection script determines one or more content elements to be measured from a web page and collects description data associated with the one or more content elements. The description data describes information about the one or more content elements. The analytics engine creates an analytics result based on the description data. The analytics result describes how the one or more content elements have been consumed by users. The analytics engine then provides the analytics result for users. The present invention also includes a method for analyzing user consumption of content on web pages or user engagement with online content or of gathering measurements reflecting user and media behavior, from a browser, displaying a web page.

BRIEF DESCRIPTION OF THE DRAWINGS

The present invention is illustrated by way of example, and not by way of limitation in the figures of the accompanying drawings in which like reference numerals are used to refer to similar elements.

FIG. 1 is a block diagram illustrating an embodiment of an example system for measuring content consumption in accordance with the present invention.

FIG. 2B is a block diagram illustrating the User-Behavior Determination Module, the Content Structure Determination Module, and the Content Tool Module.

DETAILED DESCRIPTION OF EMBODIMENTS

Figure 2A:
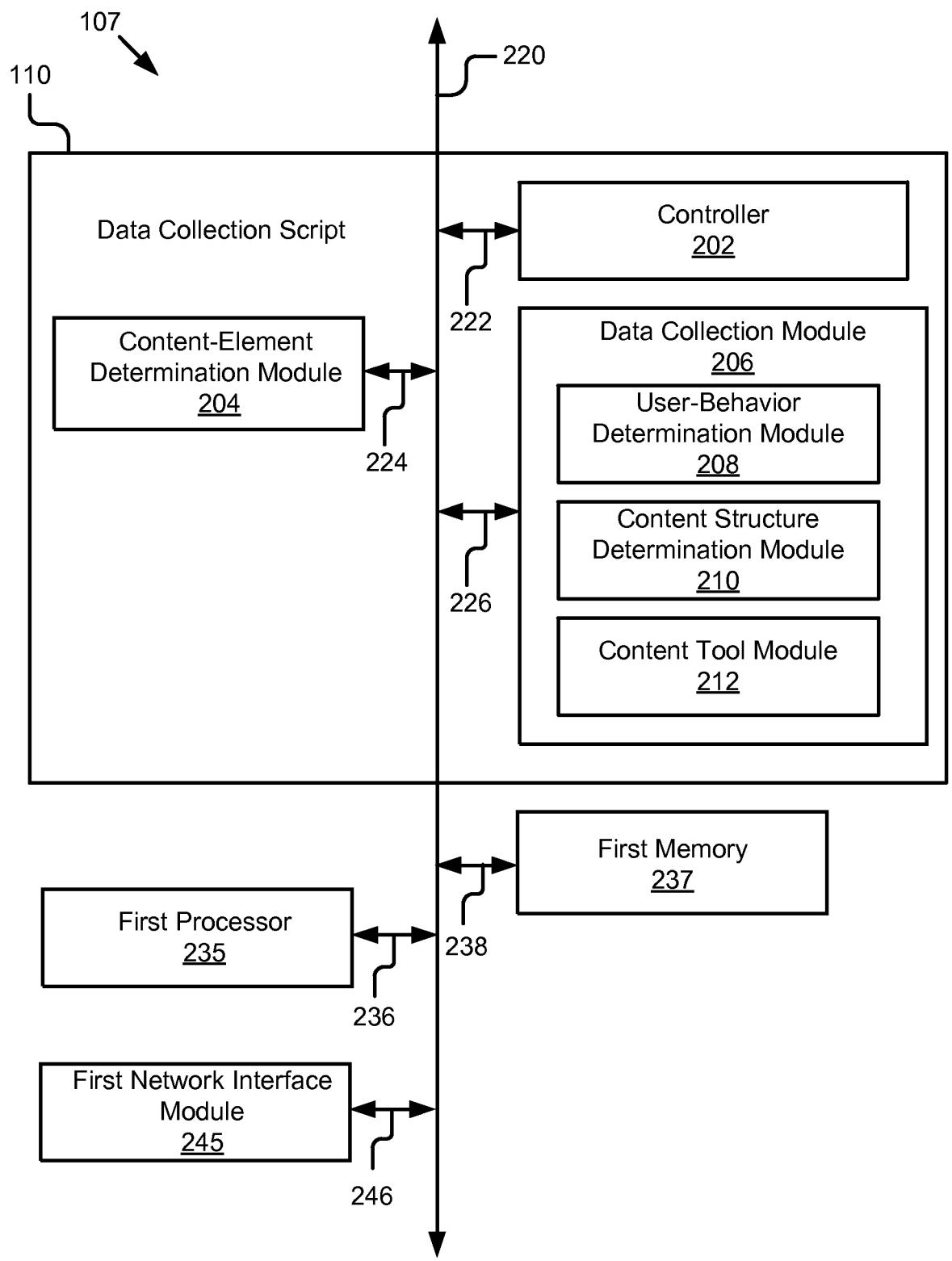
FIG. 2A is a block diagram illustrating an embodiment of an example client device including a data collection script in accordance with the present invention.

FIG. 1 illustrates a block diagram of one embodiment of the system 100 for measuring content consumption, by gathering measurements of user and media behavior, from a browser displaying a web page, to infer aspects of user attention to content on the web page that is viewed, in accordance with the present invention. The system 100 advantageously determines online content to be measured and collects data associated with the content. The system 100 also creates and provides analytics results about consumption of the online content so that publishers that publish the online content are able to qualify consumer interests, qualify content quality and value online advertisements associated with the content, etc. For many examples in the specification below, online content can be any text, picture or video created and/or published by publishers on web pages which are accessible to users. Furthermore, for many examples in the specification below, an online advertisement (ad) is any text, picture or video whose purpose is advertising communication including any flash asset, any image of Internet Advertising Board (IAB) or industry standard width and height that is clickable including any recursion into iframes from the original page.

The illustrated system 100 includes a script server 101, a training rules server 106, a user display dashboard 105, an analytics server 104, a content server 102, an ad server 111, and one or more client devices 107a-107n that are accessed by users 125a-125n. In the illustrated embodiment, these entities are communicatively coupled via a network 103. Although only two client devices 107a-n are illustrated, it should be recognized that any number of client devices 107n are available to any number of users 125n. Furthermore, while only one network 103 is coupled to the script server 101, the training rules server 106, the user display dashboard 105, the analytics server 104, the content server 102, the ad server 111, and the one or more client devices 107a-107n, in practice any number of networks 103 can be connected to these entities. In one embodiment, the script server 101, the training rules server 106, the analytics server 104, the content server 102 and the ad server 111 are hardware servers including a processor, memory, and network communication capabilities.

The network 103 is of conventional type, wired or wireless, and may have any number of configurations such as a star configuration, token ring configuration, or other configurations. Furthermore, the network 103 may comprise a local area network (LAN), a wide area network (WAN) (e.g., the Internet), and/or any other interconnected data path across which multiple devices may communicate. In yet another embodiment, the network 103 may be a peer-to-peer network. The network 103 may also be coupled to or includes portions of a telecommunications network for sending data in a variety of different communication protocols. In yet another embodiment, the network 103 includes Bluetooth communication networks or a cellular communications network for sending and receiving data such as via short messaging service (SMS), multimedia messaging service (MMS), hypertext transfer protocol (HTTP), direct data connection, WAP, email, etc.

The client device 107a is representative of client devices 107a-107n and is a conventional type of computing device, for example, a personal computer, a hardware server, a laptop computer, a tablet computer or smart phone. The client devices 107a-107n are coupled to the network 103 by signal lines 122a-122n, respectively. In one embodiment, the client device 107 (any one or more of 107a-107n) is coupled to receive online advertisements from the ad server 111 and other content from publishing sites or third party servers (not shown). The client device 107 includes a web browser 108 for presenting web pages including online content and advertisements to the user 125. The web browser 108 presents advertisements and other content and receives input from the user 125 as represented by signal line 124. The web browser 108 and a data collection script 110 are operable on the client device 107. In one embodiment, the data collection script 110 is embedded on the web browser 108 from the script server 101. In another embodiment, the data collection script 110 is placed on the web browser 108 from the ad server 111. In yet another embodiment, the data collection script 110 is embedded on the web browser 108 from the content server 102. The data collection script 110 determines content elements to be measured from web pages, retrieves description data associated with the content elements, and sends the description data to the analytics server 104, the content server 102, or the ad server 111, depending on where a content-engagement inference engine 118 is stored. As illustrated, the content-engagement-inference engine 118a may be stored in the analytics server 104, the ad server (as content-engagement-inference engine 118b), or the content server 102 (as content-engagement-inference engine 118c). In some embodiments, the description data can include user interaction data describing user interactions with the content elements and metadata associated with the content elements and the web page. The operation of the client device 107 with embedded data collection script 110 is described in more detail below with reference to FIGS. 2A and 2B. The data collection script 110 advantageously collects information non-intrusively and incrementally as will be described in more detail below.

The script server 101 is a computer program running on a hardware system for providing one or more scripts to web pages. For example, the script server 101 may be a web server that creates and provides scripts for publishers to place the scripts on web browsers 108. In one embodiment, the script server 101 provides the data collection script 110 to a publisher that places the data collection script 110 on a web browser 108 that provides a web page containing content to be measured. In another embodiment, the ad server 111 is used to place the data collection script 110 on the web browser 108. In yet another embodiment, the content server 102 is used to place the data collection script 110 on the web browser 108. The script server 101 is coupled to the network 103 by signal line 133 for providing scripts to be placed on web browsers 108.

The training rules server 106 is a computer program running on a hardware system for providing training rules regarding determination and analysis of content published by certain publishers. For example, the training rules server 106 may be a web server that receives and/or creates a set of rules specific to a certain publisher and sends the publisher-specific rules to the data collection script 110 and one of the analytics server 104, the ad server 111 and the content server 102 depending on where an analytics engine 118 is stored. The training rules server 106 is coupled to the network 103 by signal line 131 for communication with the other components of the system 100.

The analytics server 104 is a computer program running on a hardware system for generating analytics results about consumption of online content on web pages. For example, the analytics server 104 may be a web server that receives description data and/or content elements from the data collection script 110 running on the client device 107 and analyzes the description data and/or the content elements to generate analytics results indicating the extent to which the content has been consumed by users 125. The analytics server 104 is coupled to the network 103 by signal line 135 for communication with the other components of the system 100. In one embodiment, the analytics server 104 includes an analytics engine 118a (also referred to herein individually and collectively as 118). In another embodiment, the analytics engine 118 is stored on the ad server 111. For example, an analytics engine 118b is stored on the ad server 111. In yet another embodiment, the analytics engine 118 is stored on the content server 102. For example, an analytics engine 118c is stored on the content server 102. The analytics engine 118 is described in more detail below with reference to FIG. 3.

The ad server 111 is a computer program running on a hardware system for placing advertisements on websites and/or placing the data collection script 110 on web pages. For example, the ad server 111 may be a web server that receives advertisements from the ad preparation server or the advertising asset server (not shown) and delivers them to website visitors. The ad server 111 is coupled to the network 103 by signal line 143 for receiving ads from the ad preparation server or the advertising asset server (not shown) and for delivering the ads to third party servers, sites or domains (not shown).

The content server 102 is a computer program running on a hardware system for placing content on websites and/or placing the data collection script 110 on web pages. For example, the content server 102 may be a web server that provides the data collection script 110 for publishers to place the script 110 on web browsers 108. The content server 102 is coupled to the network 103 by signal line 141 for communication with the other components of the system 100.

Data Collection Script 110

FIG. 2A is a block diagram of one embodiment of a client device 107 including a data collection script 110. In this embodiment, the client device 107 comprises: the data collection script 110, a first processor 235, a first memory 237, a first network interface module 245 and a bus 220. As noted above, the data collection script 110 is placed by a publisher on the web browser 108 of the client device 107 from one of the script server 101, the content server 102 and the ad server 111. For example, the client device 107 is used by a user 125 to run a web browser for opening a web page. The data collection script 110 is placed on the web browser to collect content of the web page to be measured.

The first processor 235 comprises an arithmetic logic unit, a microprocessor, a general-purpose controller or some other processor array to perform computations and provide electronic display signals to a display device. The first processor 235 is coupled to the bus 220 for communication with the other components via signal line 236. First processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. Other processors, operating systems, sensors, displays and physical configurations are possible.

The first memory 237 stores instructions and/or data that may be executed by first processor 235. The first memory 237 is coupled to the bus 220 via signal line 238 for communication with the other components via signal line 238. The instructions and/or data may comprise code for performing any and/or all of the techniques described herein. The first memory 237 may be a dynamic random access memory (DRAM) device, a static random access memory (SRAM) device, flash memory or some other memory device.

The first network interface module 245 is coupled to network 103 by signal line 246 and coupled to the bus 220. The first network interface module 245 includes ports for wired connectivity such as but not limited to USB, SD, or CAT-5, etc. The first network interface module 245 links the first processor 235 to the network 103 that may in turn be coupled to other processing systems. The first network interface module 245 provides other connections to the network 103 using standard network protocols such as TCP/IP, HTTP, HTTPS and SMTP. In other embodiments, the first network interface module 245 includes a transceiver for sending and receiving signals using Wi-Fi, Bluetooth® or cellular communications for wireless communication. The first network interface (I/F) module 245 provides a communication path for the components of the client device 107 to the network 103 and other systems.

In the illustrated embodiment shown in FIG. 2A, the data collection script 110 includes a controller 202, a content-element determination module 204 and a data collection module 206. The components of the data collection script 110 are communicatively coupled to each other via the bus 220.

The controller 202 is software, code or routines for handling communications between data collection script 110 and other components of the client device 107. For example, the controller 202 is coupled to receive a signal indicating that a web page is rendered from the web browser 108 and delivers the signal to one or more other modules of the data collection script 110, e.g., the content-element determination module 204. In one embodiment, the controller 202 receives collected description data of the content elements on web pages from one or more other modules of the data collection script 110 and sends, via the network interface module 245, the description data to the analytics server 104, the ad server 111 or the content server 102 depending on where the analytics engine 118 is stored. The controller 202 is coupled to the bus 220 via signal line 222 for communications with other components of the client device 107.

The content-element determination module 204 is software, code or routines for determining content elements to be measured from web pages. The content-element determination module 204 is coupled to receive a signal indicating that a web page is rendered and coupled to determine content elements to be measured on this web page. In some embodiments, the content-element determination module 204 learns configurations of programming of the web page and determines content on the web page based on the configurations. For example, the content-element determination module 204 detects "Div Tags" in the configurations of the web page and determines that one or more content items between two "Div Tags" are not advertisements and thus might be content. In some embodiments, the content-element determination module 204 is coupled to receive a training document from the training rules server 106 via the controller 202 and the network 103. For example, a training document includes a set of training rules that might be created by one or more publishers and describe which elements of programming on the web page are indications of content. The content-element determination module 204 uses the training rules to find content items to be measured. In some embodiments, the content-element determination module 204 also searches for telltales of content on the web page. For example, the content-element determination module 204 searches headlines, photos and/or other telltales within content elements. In some embodiments, the content-element determination module 204 detects content sharing by monitoring elements and software products that may appear on the web page. For example, the content-element determination module 204 detects "Share This widget" on the web page. In some embodiments, the content-element determination module 204 detects content sharing by monitoring cutting and pasting of the page's uniform resource locator (URL) from the browser address bar. The content-element determination module 204 is coupled by the bus 220 via signal line 224 for communications with the controller 202, the data collection module 206 and other appropriate components of the client device 107.

The data collection module 206 is software, code or routines for collecting description data associated with the content to be measured. Based upon the content elements to be measured, the data collection module 206 collects description data associated with the content elements. In one embodiment, the description data can include user interaction or behavior data describing user interactions with the content elements and metadata associated with the content elements and the web pages including the content elements. Examples for the description data can include, but not limited to, a location of the content element on the web page, cursor and/or gesture inputs from the user or cursor movements, a position of the scroll bar or scrolling behavior, a speed of the movement of the scroll bar or scrolling velocity, an acceleration of the movement of the scroll bar, a timing of the movement of the scroll bar or time spent, a density of the content and advertisement on the web page (i.e., "clutter"), scrolling direction, comments, sharing, navigation etc. In some embodiments, the data collection module 206 also collects information that may be specific to a content presentation, design or the type of content. For example, some articles require users to click to get to "more" of the article; most video content has player controls to play or pause the video. Therefore, the data collection module 206 collects data describing different types of user interactions with the different types of content as described above. The data describing the different types of user interactions can then be analyzed with respect to the different types of content by the analytics engine 118 to assess how the types of content was consumed by users 125. In some embodiments, the data collection module 206 collects metadata that helps in qualifying the collected user interactions. Examples for metadata can include, but not limited to, article titles, page names, content thumbnails, additional information that may be useful in determining what content was being measured, where it was located on the web page and the conditions under which the measurements occurred, etc. The data collection module 206 transmits the collected description data to the content-engagement-inference engine 118 for analysis via the controller 202 and the network 103. The data collection module 206 is coupled to the bus 220 via signal line 226 for communication with the controller 202 and the content-element determination module 204.

In the illustrated embodiment, the data collection module 206 comprises a user-behavior determination module 208, content structure determination module 210, and content tool module 212. Referring now to FIG. 2B. the user-behavior determination module 208 may use example metrics, including, but not limited to, cursor movement, scrolling behavior, scrolling velocity, scrolling direction, comments, sharing, navigation, time spent etc. The content structure determination module 210 may use example metrics, including, but not limited to, headlines, photo within a frame, content boundary, etc. The content tool module 212 includes example metrics, including, but not limited to, content boundary, content type, div tags, browser type, re-sizing screen action, etc.

Content-Engagement Inference Engine 118

Figure 3A:
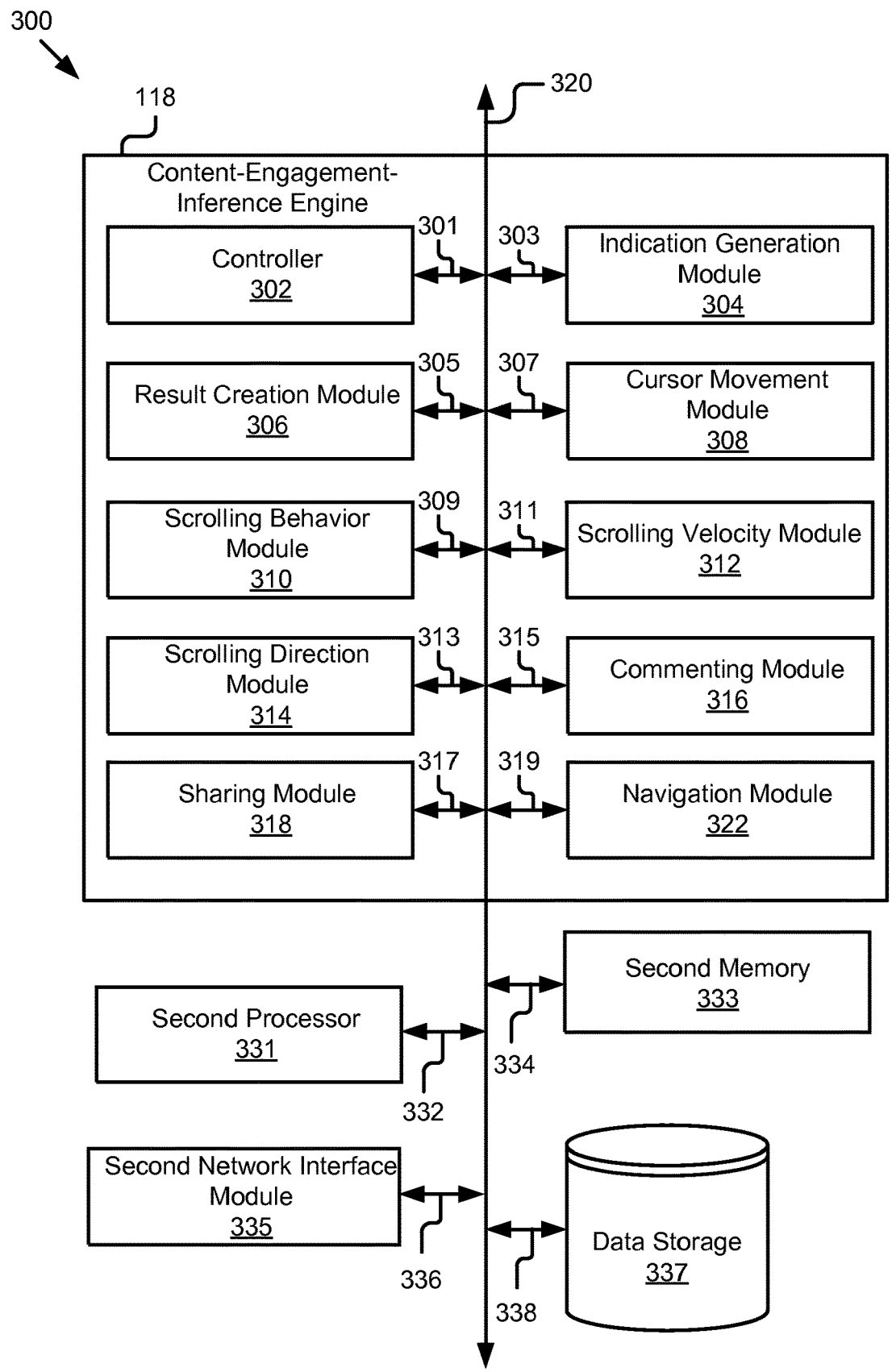
FIGS. 3A, 3B, and 3C are a block diagram illustrating an embodiment of an analytics engine in accordance with the present invention.

Referring now to FIG. 3A, the content-engagement-inference engine 118 will be described in more detail. FIG. 3A is a block diagram illustrating one embodiment of a computing device 300 including the content-engagement-inference engine 118. In one embodiment, the computing device 300 can be the analytics server 104. In another embodiment, the computing device 300 can be the ad server 111. In yet another embodiment, the computing device 300 can be the content server 102. In the illustrated embodiment, the computing device 300 comprises a second processor 331, a second memory 333, a second network interface (I/F) module 335 and data storage 337. These components are communicatively coupled to each other by bus 320 for sending and receiving information.

The second processor 331, the second memory 333, the second network interface (I/F) module 335 and the bus 320 have the same or similar functionality to the first processor 235, the first memory 237, the first network interface (I/F) module 245 and the bus 220 respectively described above with reference to FIG. 2A, so that description will not be repeated here. It should be noted, however, that the network interface module 335 is coupled by signal line 336 to the bus 320. The second processor 331 is coupled by signal line 332 to the bus 320. The second memory 333 is coupled by signal line 334 to the bus 320.

The data storage 337 stores data, information and instructions used by the computing device 300. Such stored information includes information about users, publishers, ads, assets, and other information. In one embodiment, the data storage 337 stores data received by the computing device 300 as well as data generated during intermediate processes. In one embodiment, the data storage 337 is of conventional type. The data storage 337 is a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device for storing information on a more permanent basis. The data storage 337 is coupled by the bus 320 via signal line 338 for communication with other components of the computing device 300. The data storage 339 will be described in further detail below with reference to FIG. 8.

Figure 3B:
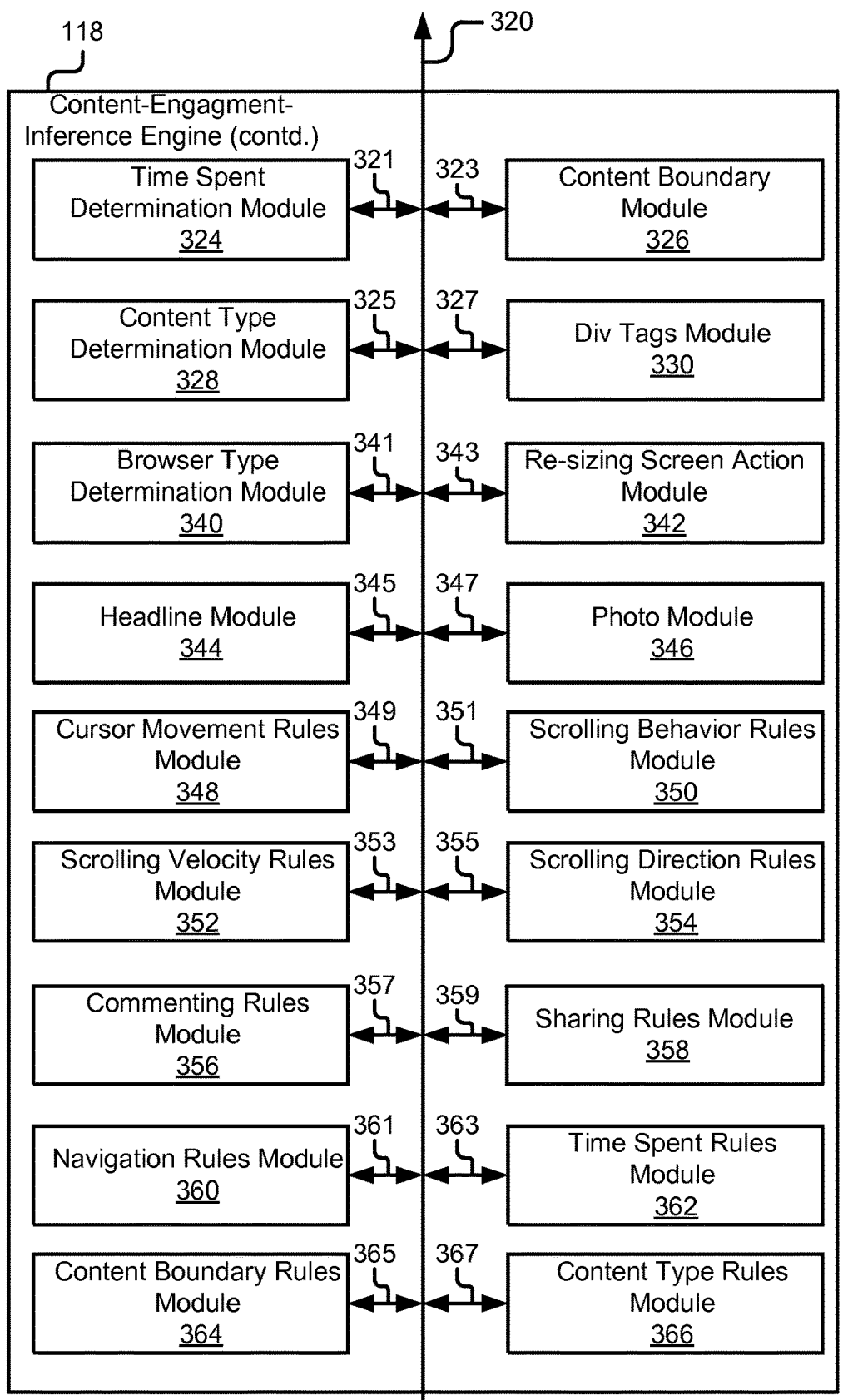

In the illustrated embodiment, the content-engagement-inference engine 118 includes a controller 302, an indication generation module 304, a result creation module 306, a cursor movement module 308, a scrolling behavior module 310, a scrolling velocity module 312, a scrolling direction module 314, a commenting module 316, a sharing module 318, and a navigation module 322. The controller is coupled to the bus 320 by signal line 301, the indication generation module 304 is coupled to the bus 320 by signal line 303, a result creation module 306 is coupled to the bus 320 by a signal line 305, a cursor movement module 308 is coupled to the bus 320 by a signal line 307, a scrolling behavior module 310 is coupled to the bus 320 by a signal line 309, a scrolling velocity module 312 is coupled to the bus 320 by a signal line 311, a scrolling direction module 314 is coupled to the bus 320 by a signal line 313, a commenting module 316 is coupled to the bus 320 by a signal line 315, a sharing module 318 is coupled to the bus 320 by a signal line 317, and a navigation module 322 is coupled to the bus 320 by a signal line 319. Referring now to FIG. 3B, the content-engagement-inference engine 118 further comprises a time spent determination module 324 coupled to the bus 320 by a signal line 321, a content boundary module 326 coupled to the bus 320 by a signal line 323, a content type determination module 328 coupled to the bus 320 by a signal line 325, a div tags module 330 coupled to the bus 320 by a signal line 327, a browser type determination module 340 coupled to the bus 320 by a signal line 341, a re-sizing screen action module 342 coupled to the bus 320 by a signal line 342, a headline module 344 coupled to a bus 320 by a signal line 345, a photo module 346 coupled to the bus 320 by a signal line 347, a cursor movement rules module 348 coupled to the bus 320 by a signal line 349, a scrolling behavior rules module 350 coupled to the bus 320 by a signal line 351, a scrolling velocity rules module 352 coupled to the bus 320 by signal line 353, a scrolling direction rules module 354 coupled to the bus 320 by a signal line 355, a commenting rules module 356 coupled to the bus 320 by a signal line 357, a sharing rules module 358 coupled to the bus 320 by a signal line 359, a navigation rules module 360 coupled to the bus 320 by a signal line 361, a time spent rules module 362 coupled to the bus 320 by a signal line 363, a content boundary rules module 364 coupled to the bus 320 by a signal line 365, a content type rules module 366 coupled to the bus 320 by a signal line 367.

Figure 3C:
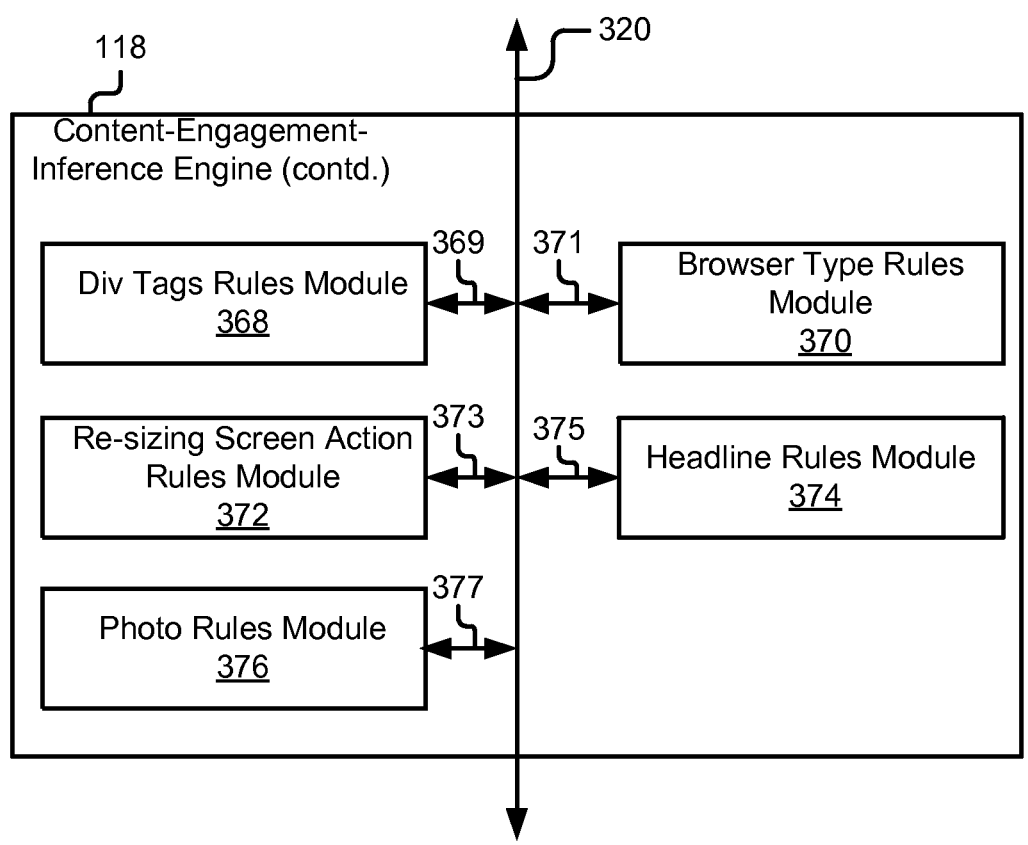

Referring now to FIG. 3C, the content-engagement-inference engine further comprises a div tags rules module 368 coupled to the bus 320 by a signal line 369, a browser type rules module 370 coupled to the bus 320 by a signal line 371, a re-sizing screen action rule module 372 coupled to the bus 320 by a signal line 373, a headlines rules module 374 coupled to the bus 320 by a signal line 375, a photo rules module 377 coupled to the bus 320 by a signal line 377.

The controller 302 is software, code, or routines for handling communications between the analytics engine 118 and other components of the computing device 300. For example, the controller 302 is coupled to receive description data from the data collection script 110 and delivers the description data to one or more other modules of the content-engagement-inference engine 118, e.g., the indication generation module 304 or any of the other modules shown. In one embodiment, the controller 302 receives created analytics results from one or more other modules of the content-engagement-inference engine 118 and sends, via the network interface module 335, the analytics results to the user display dashboard 105 for users 125 to review. The controller 302 is coupled to the bus 320 via signal line 301 for communications with other components of the computing device 300.

The indication generation module 304 is software, code or routines for processing received description data and generating indications of how content was consumed. The indication generation module 304 is coupled by the network 103 to one or more client devices 107 and thus one or more data collection scripts 110. Each of the one or more data collection scripts 110 sends description data to the content-engagement-inference engine 118 and the description data is transmitted to the indication generation module 304 via the controller 302. In some embodiments, the indication generation module 304 processes the description data and estimates which content was consumed by users 125. The indication generation module 304 also estimates engagement associated with the consumption. For example, the indication generation module 304 uses scroll bar and cursor movements, as well as the location of the content (i.e., where on the web page the content resides) to generates indications of reading progress for an article. In this example, the indication generation module 304 assumes that short but regular scroll movement is an indication that a user 125 is reading down a page. In another example, the indication generation module 304 may determine that a cursor movement along lines of text is an indication of a user 125 using a cursor as a reading aid. The indication generation module 304 is coupled to the bus 320 via signal line 303 for communication with the controller 302, the result creation module 306 and other components of the computing device 300.

The result creation module 306 is software, code, and routines for creating an analytics result based on the indications of how the content was consumed. The result creation module 306 is coupled to receive generated indications from the indication generation module 304 and process the indications to derive conclusions. In some embodiments, the result creation module 306 processes the generated indications to create a composite view of what and how content was consumed by users. In some embodiments, the result creation module 306 uses machine-learning algorithms to learn how various indications correlate with each other and thus can derive meanings in cases including non-obvious behaviors. For example, the result creation module 306 uses an algorithm to learn that a rapid movement of a cursor towards a content element, e.g., an article, usually indicates that the content element, e.g., the article, will be read by the user 125. Therefore, the result creation module 306 can infer user interest in the content element, e.g., the article, based only on a cursor movement if no other data is present.

In one embodiment, the result creation module 306 analyzes characteristics of the video display software and assumes that if a user 125 played a video then the user 125 was viewing the video and if the user 125 stopped playing the video then the user 125 was not viewing the video. In some embodiments, the result creation module 306 performs the functionality by being trained based on the machine-learning algorithms. In some embodiments, the result creation module 306 creates inference or analytics results describing what and how content was consumed and sends the results to the user display dashboard 105 for users 125 to review. The results can include a variety of indices. Examples for the indices can include, but not limited to, page quality index, attention quality index, sharing activity, reading progress (for text), in-view time, focused cursor activity in photo frame, dwell time, content quality index, page dwell time, clicks, universal interaction with content (cursor or gesture), advertising clicks on page, percentage of article viewed, percentage of loads where headlines was viewed, percentage of loads where end of article visible on page, article headline visible on load, time with some portion of article visible on page, scrollable (article longer than viewport), page clutter, mouse interaction (e.g., mouse moving left to right and down several times, etc.), percentage of users who highlighted text or search for words, social interactions (e.g., comment, print, email to a friend, bookmark, share, tweet, etc.), median statistics, session time, highlighting/mouse heatmaps, the number of scrolls per session, the speed of scroll (e.g., slower indicates more engagement), ceilings for in-view time contribution by section of article (e.g., each 800 pixel section of the article is only allowed to contribute 30 seconds to in-view time), the number of words in an article, the user's speed of reading, whether there are images or videos in an article, etc.

In some embodiment, the result creation module 306 derives different conclusions and processes different data depending on the type of the content to be measured. For example, the result creation module 306 assumes that users 125 may normally park their cursor somewhere other than where they are reading text to keep the cursor out of the way, while users 125 often park the cursor on the controls of a video when they are viewing the video. The result creation module 306 then processes different user interaction data and metadata and thus derives different inferences or analytics results for different types of content. In some embodiments, for each type of content, a set of rules indicating how to detect content of that type for the specific publisher are created and stored on the training rules server 106. The data collection script 110 and the content-engagement-inference engine 118 are able to access the set of rules. For example, the data collection script 110 determines content elements to be measured and collects data associated with the content elements based on sets of rules specific for different types of content and different publishers. The results creation module 306 retrieves the sets of rules specific for different types of content and different publishers, analyzes indications and creates inference or analytics results based on the sets of rules. In this way, the system can adapt to publisher-specific technology solutions for presenting content. The result creation module 306 is coupled to the bus 320 via signal line 305 for communication with the controller 302, the indication generation module 304 and other components of the computing device 300.

In some embodiments the cursor movement module 308 is software, code, and routines for creating or generating an inference based on determining cursor movements by the user. Cursor movements by the user can indicate the user's actions. For example, if the cursor is moved rapidly, it can be inferred the user is not engaged by the content. If the cursor movements are consistent and slowly moving through content, it can be inferred that the user is actually reading and engaging with the content.

In some embodiments, the scrolling behavior module 310 is software, code, and routines for creating an inference or analytics result based on the scrolling behavior of the user. By the scrolling behavior, it can be inferred if the user is reading or simply browsing through the content.

In some embodiments, the scrolling velocity module 312 is software, code, and routines for creating or generating an inference or analytics result based on the velocity of the scrolling. By determining the velocity of a user's scrolling behavior, the system and methods of the present invention can infer if a user is actually reading or simply quickly browsing through content.

In some embodiments, the scrolling direction module 314 is software, code, or routines for creating or generating an inference based on the direction of the scrolling. For example, if the scrolling occurs from left to right, it can be assumed that the user is reading the content, whereas if the scrolling is from top to bottom, it can be assumed that the user is simply quickly browsing or glimpsing through the content.

In some embodiments, the commenting module 316 is software, code, or routines for creating or generating an inference based on if the user provides any comments on the content. For example, if the scrolling occurs from left to right, it can be assumed that the user is reading the content, whereas if the scrolling is from top to bottom, it can be assumed that the user is simply quickly browsing or glimpsing through the content.

In some embodiments, the sharing module 318 is software, code, or routines for creating or generating an inference based on if the user shares the content with others. It can be assumed that if a user shares content with friends or others known to the user for whatever purpose, the content is of interest to the user.

In some embodiments, the navigation module 322 is software, code, or routines for creating or generating an inference based on how the user navigates through the content. As an example, a user may use a cursor or other tools to navigate through the content. As another example, a user may simply navigate and exit the content. In this instance, it can be inferred that the user is not engaged by the content.

In some embodiments, the time spent determination module 324 is software, code, or routines for creating or generating an inference based on how much time the user spends viewing the content. As an example, a user typically spends more time on content that the user finds interesting and less on content that is not interesting. The more time a user spends is an indication that the user is engaging with the content.

In some embodiments, the content boundary module 326 is software, code, or routines for creating or generating an inference based on content boundary. In one example, a user's engagement with particular content is determined if a user's cursor is within the boundary of the particular content.

In some embodiments, the content type determination module 328 is software, code, or routines for creating or generating an inference based on content type. In one example, a content type may inform on a user's level of interest.

In some embodiments, the div tags module 330 is software, code, or routines for creating or generating an inference based on div tags. In one example, a user's engagement with particular content is determined if a user's cursor is within the boundary of the particular content, which is determined by the "Div Tags," which indicates that the item between them is content.

In some embodiments, the browser type determination module 340 is software, code, or routines for creating or generating an inference based on the browser type. In some embodiments, the re-sizing screen action module 342 is software, code, or routines for creating or generating an inference based on re-sizing the screen. In one example, a user's engagement with particular content is determined if a user enlarges the screen to seek a closer look.

In some embodiments, the headline module 344 is software, code, or routines for creating or generating an inference based on headlines. In some embodiments, a photo module 346 is software, code, or routines for creating or generating an inference based on photos within the content. In some examples, a user's engagement with particular content is determined by gauging a user's attention to the headline or photographs within content.

In some embodiments, a cursor movement rules module 348 is software, code, or routines for creating or generating an inference based on cursor movement rules. These rules may be provided by an entity, for example a particular publisher. In some embodiments, the scrolling behavior rules module 350 is software, code, or routines for creating or generating an inference based on scrolling behavior rules designated by an entity, for example, a publisher. In some embodiments, a scrolling velocity rule module 352 is software, code, or routines for creating or generating an inference based on scrolling velocity rules. These rules may be provided by an entity, for example a particular publisher. In some embodiments, a scrolling direction rules module 354 is software, code, or routines for creating or generating an inference based on scrolling direction rules. These rules may be provided by an entity, for example a particular publisher. In some embodiments, a commenting rules module 356 is software, code, or routines for creating or generating an inference based on commenting rules. These rules may be provided by an entity, for example a particular publisher. In some embodiments, a sharing rules module 358 is software, code, or routines for creating or generating an inference based on sharing rules. These rules may be provided by an entity, for example a particular publisher. In some embodiments, a navigation rules module 360 is software, code, or routines for creating or generating an inference based on navigation rules. These rules may be provided by an entity, for example a particular publisher. In some embodiments, a time spent rules module 362 is software, code, or routines for creating or generating an inference based on rules by which the amount of time spent is determined and the corresponding indications are inferred. These rules may be provided by an entity, for example a particular publisher. In some embodiments, the content boundary rules module 364 is software, code, or routines for creating or generating an inference based on content boundary rules. These rules may be provided by an entity, for example a particular publisher. In some embodiments, the content type rules module 366 is software, code, or routines for creating or generating an inference based on content type rules. These rules may be provided by an entity, for example a particular publisher.

In some embodiments, the div tags rules module 368 is software, code, or routines for creating or generating an inference based on div tags rules to determine the boundary of particular content. These rules may be provided by an entity, for example a particular publisher. In some embodiments, the browser type rules module 370 is software, code, or routines for creating or generating an inference based on browser type rules. These rules may be provided by an entity, for example a particular publisher. In some embodiments, the re-sizing screen action rules module 372 is software, code, or routines for creating or generating an inference based on re-sizing action rules. These rules may be provided by an entity, for example a particular publisher. In some embodiments, the headline rules module 374 is software, code, or routines for creating or generating an inference based on headline rules. These rules may be provided by an entity, for example a particular publisher. In some embodiments, the photo rules module 376 is software, code, or routines for creating or generating an inference based on photo rules. These rules may be provided by an entity, for example a particular publisher.

It should be recognized that the systems and methods of the present invention may be configured with as many of these types of modules to determine the metrics desired to determine the extent of engagement by users with particular content.

Methods

Figure 4:
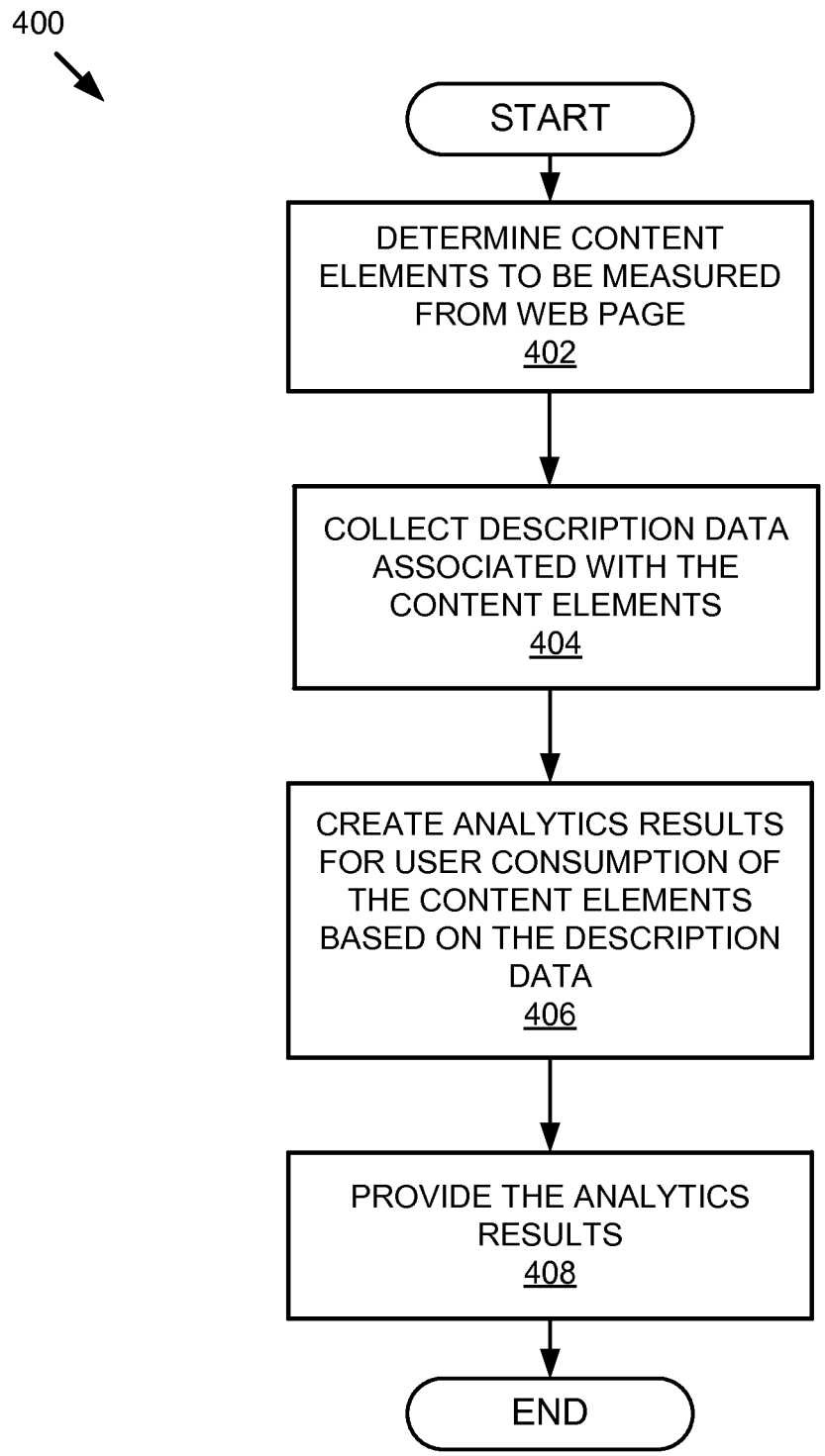
FIG. 4 is a flowchart of one embodiment of a method for providing analytics results for content consumption in accordance with the present invention.

Referring now to FIG. 4, one embodiment of a method 400 for providing analytics results for content consumption or for determining the extent of engagement by users with particular content is described. The method 400 begins at block 402, including one or more operations for determining content elements to be measured from a web page. In other words, the data collection script 110 determines content elements on a web page that will be analyzed. For example, the data collection script 110 determines that an article or a video on a web page is content element not an advertisement. The method 400 continues to block 404, including one or more operations for collecting 404 description data associated with the content elements. For example, the data collection script 110 retrieves description data including user interaction data describing user interactions with the content and metadata for the content and the web page. The method 400 then proceeds to one or more operations illustrated by block 406, for creates or generating analytics results for user consumption of the content elements based on processing of the description data. For example, the analytics engine 118 processes the description data associated with the content elements and creates analytics results describing how the content elements were consumed by users 125. The method 400 proceeds to block 408 including one or more operations for providing the analytics results to users 125. For example, the analytics engine 118 sends the analytics results to the user display dashboard 105 for displaying the results to users 125. It should be recognized that the designation of "END" is simply to illustrate a conclusion to these operations. In addition, one or more of the illustrated operations may be omitted or replaced with other similar operations as determined by those skilled in the art. In addition, other operations may be added if desired.

The present invention is particularly advantageous because this process for providing analytics results on content-engagement inferences will automatically execute without any impact on the rendering of the web page. Furthermore, the present invention advantageously provides accurate analytics results about how web content has been consumed by using user behaviors including non-obvious user behaviors as measurements. The process described with reference to FIG. 4 also allows publishers to have the ability to qualify user interests, qualify content quality and evaluate advertising associated with the web content, etc.

Figure 5:
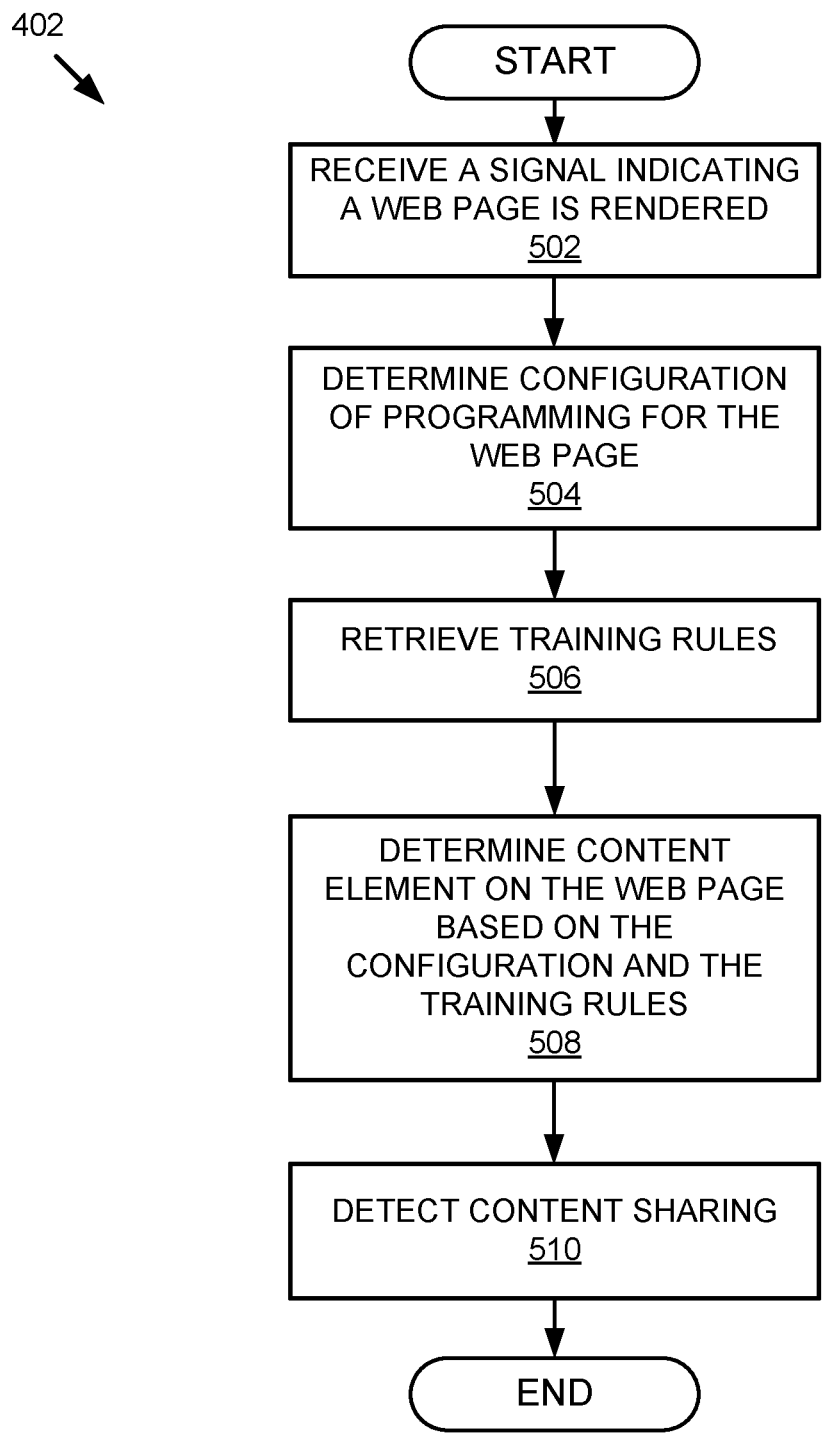
FIG. 5 is a flowchart of one embodiment of a method for determining content elements to be measured in accordance with the present invention.

Referring now to FIG. 5, one embodiment of a method 500 for determining content elements to be measured in accordance with the present invention is illustrated. The method 500 begins at block 502 including one or more operations for receiving a signal indicating that a web page is rendered. As described above, this is accomplished by the data collection script 110. For example, once the web browser 108 renders a web page, the data collection script 110 begins to execute and receives a signal indicating that a web page is rendered. The method 500 continues at block 504 including one or more operations for determining a configuration of programming for the web page. The method 500 also retrieves training rules from the training rules server 106, as illustrated by one or more operations of block 506. For example, the data collection script 110 retrieves training rules specific to a publisher and describing which elements of programming on the web page indicate which is content on the web page. The method 500 then determines at block 508, which includes one or more operations for signing for the content elements on the web page based on the configuration and the training rules. For example, the data collection script 110 determines "Div Tags" that indicate that the item between them is content. The method 500 completes this particular routine at block 510 including one or more operations for detecting content sharing. For example, the data collection script 110 detects content sharing by monitoring elements and software products that may appear on the web page or by monitoring cutting and pasting of the page URL from the browser address bar.

Figure 6:
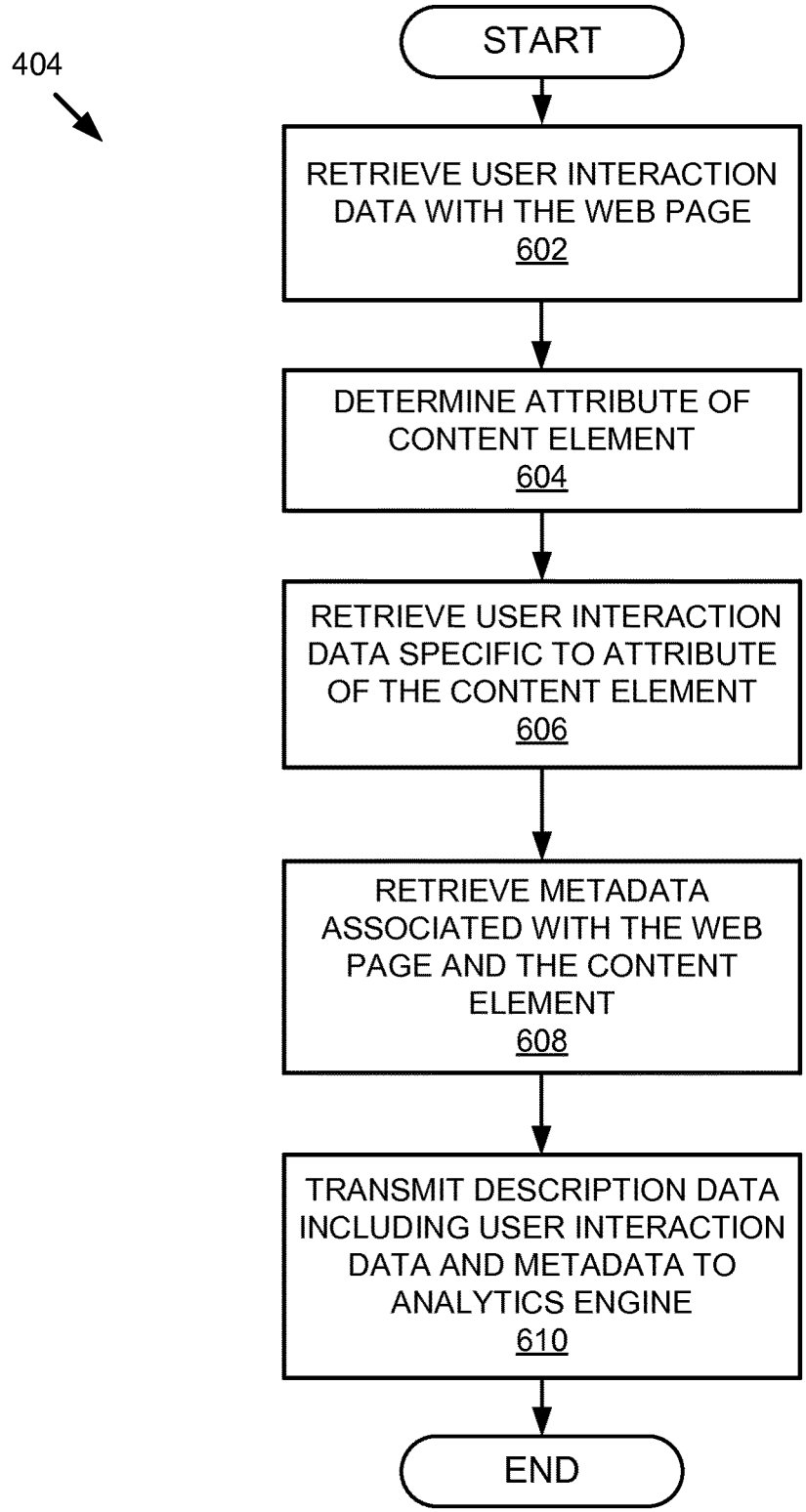
FIG. 6 is a flowchart of one embodiment of a method for collecting description data associated with content elements in accordance with the present invention.

Referring now to FIG. 6, one embodiment of a method 600 for collecting description data associated with the content elements in accordance with the present invention is described. The method 600 begins at block 602, including one or more operations for retrieving user interaction data with the web page. For example, the user interaction data includes page-user interaction data that describes user interactions with the web page. Examples for page-user interactions can include user dwelling on the web page, movements of the scroll bar of the web page, etc. The method 600 continues at block 604 including one or more operations for determining an attribute of the content element. For example, an attribute of content elements can be a presentation, a design or a type of the content element. The data collection script 110 determines a type of the content element, e.g., a video type. The method 600 then at block 606 including one or more operations retrieves user interaction data specific to the attribute of the content element. For example, for video content, the data collection script 110 assumes users 125 use player controls to play, pause or stop the video and therefore retrieves user interactions with the video player controls, e.g., clicks on the play button, clicks on the pause button, clicks on the stop button, etc. The method 600 at block 608 includes one or more operations for retrieving metadata associated with the web page and the content element. For example, the data collection script 110 retrieves article titles, a page name, content thumbnails and other additional information useful in analyzing what content was being measured, where the content resides on the web page and the conditions under which the measurement occurred. The method 600 completes this routine, at block 610, including one or more operations for transmitting description data including user interaction data and metadata to the analytics engine 118. For example, the data collection script 110 transmits, via the network 103, the collected description data including user interaction data and metadata to content-engagement-inference engine 118 for analysis.

Figure 7A:
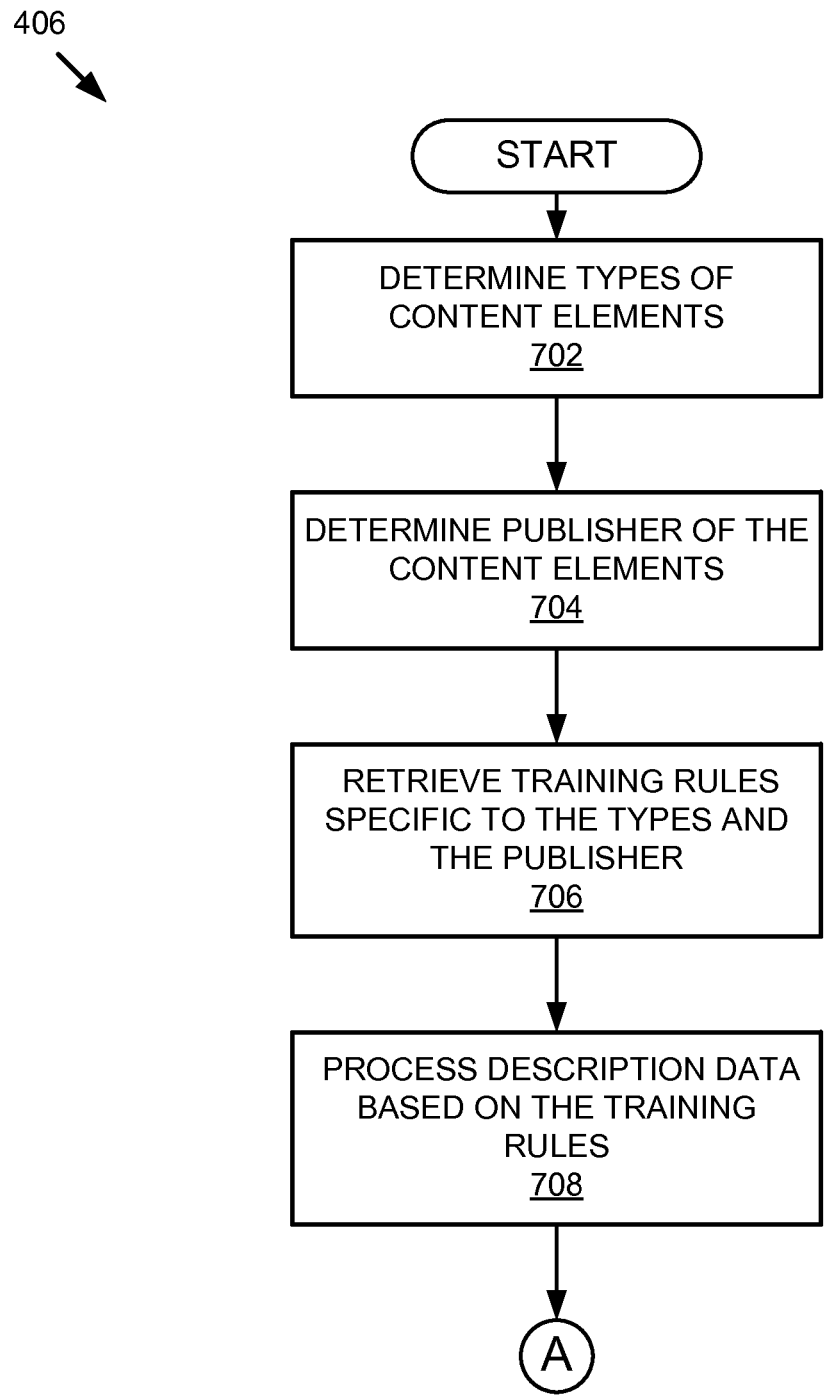
FIGS. 7A and 7B are a flowchart of one embodiment of a method for creating analytics results for content consumption in accordance with the present invention.
Figure 7B:
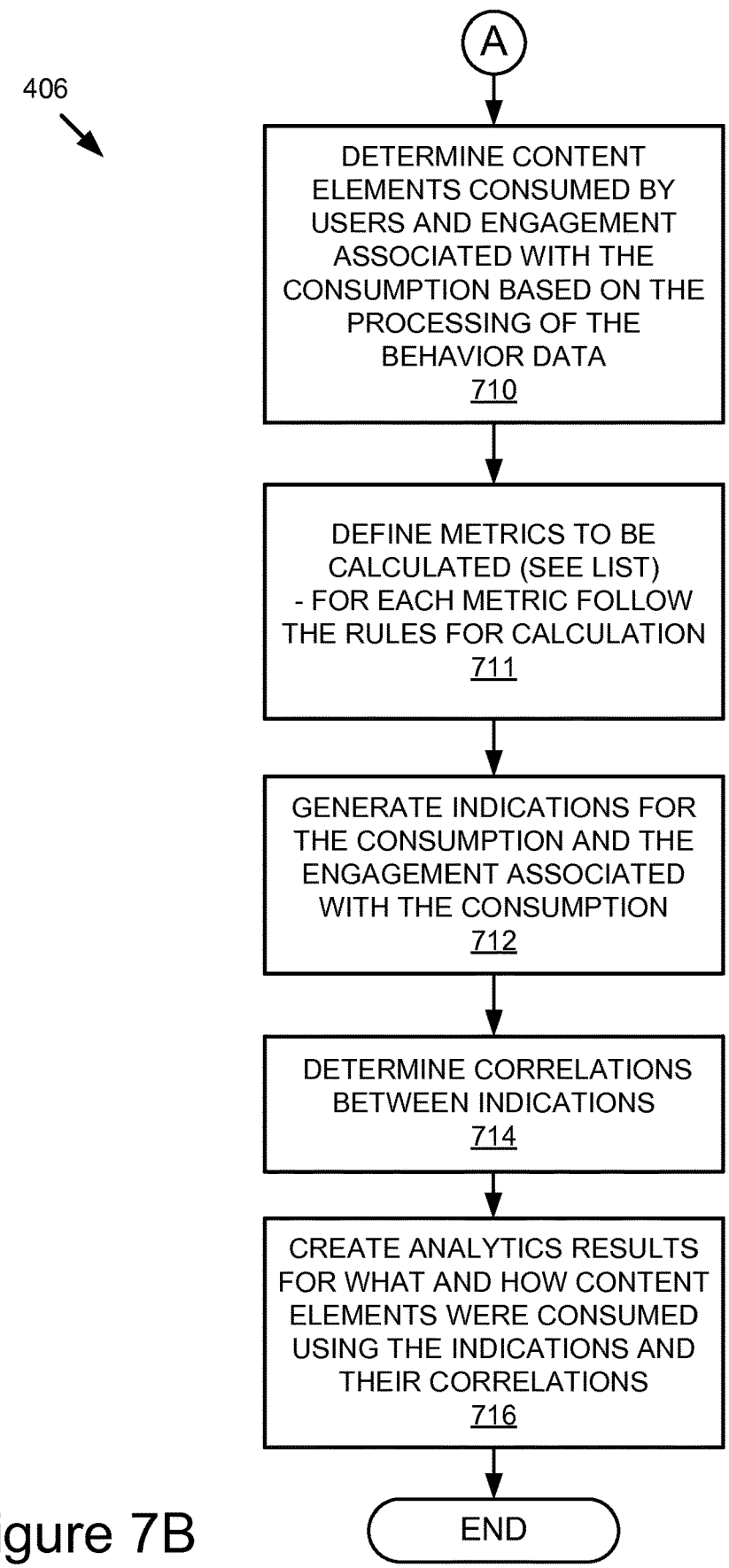

Referring now to FIGS. 7A-7B, one embodiment of a method 700 for creating analytics or content-engagement-inference results for content consumption or user engagement with content in accordance with the present invention is described. FIGS. 7A and 7B shows one embodiment for the method 700 performed by the content-engagement-inference engine 118. Referring to FIG. 7A, the method 700 begins at block 702, including one or more operations for determining types of content elements. For example, the content-engagement-inference engine 118 receives data describing a type of the content elements. For example, the content-engagement-inference engine 118 determines that a content element is a video based on the data. The method 700 continues at block 704 including one or more operations for determining a publisher of the content elements. The publisher published the content elements on the web page. The method 700, at block 706, includes one or more operations for retrieving training rules specific to the types and the publisher. For example, the content-engagement inference engine 118 retrieves a set of training rules specific to the type of the content and the publisher publishing the content from the training rules server 106. The method 700 proceeds to block 708, including one or more operations for processing description data based on the training rules. For example, the content-engagement-inference engine 118 receives description data associated with the content elements from the data collection script 110 via the network 103 and analyzes the description data based on the training rules to find how the content elements were consumed by the users.

Referring now to FIG. 7B, the method 700 continues at block 710 including one or more operations for determining content elements consumed by users and engagement associated with the consumption based on the processing of the description data. For example, the content-engagement inference engine 118 determines what content elements were actually consumed by the users and to which extent the users engaged to the content elements when consuming. The method 700 continues at block 712, including one or more operations for generating indications for the consumption and the engagement associated with the consumption. For example, the content-engagement inference engine 118 generates an indication for reading progress of an article based on data describing scroll bar and cursor movements as well as the content location on the web page. The method 700 at block 714 includes one or more operations for determining correlations between indications. The method 700 at block 716 includes one or more operations for creating or generating content-engagement-inference results for what and how content elements were consumed using the indications and their correlations.

In the method 700, for each type of content, the content-engagement inference or analytics conclusions can be reached by guidance of a set of training rules specific to the type of content and also specific to a certain publisher. For example, the content-engagement-inference engine 118 deploys different description data and derives different content-engagement-inference analytics or conclusions for the different types of the content and different publishers.

Data Storage 339

Figure 8:
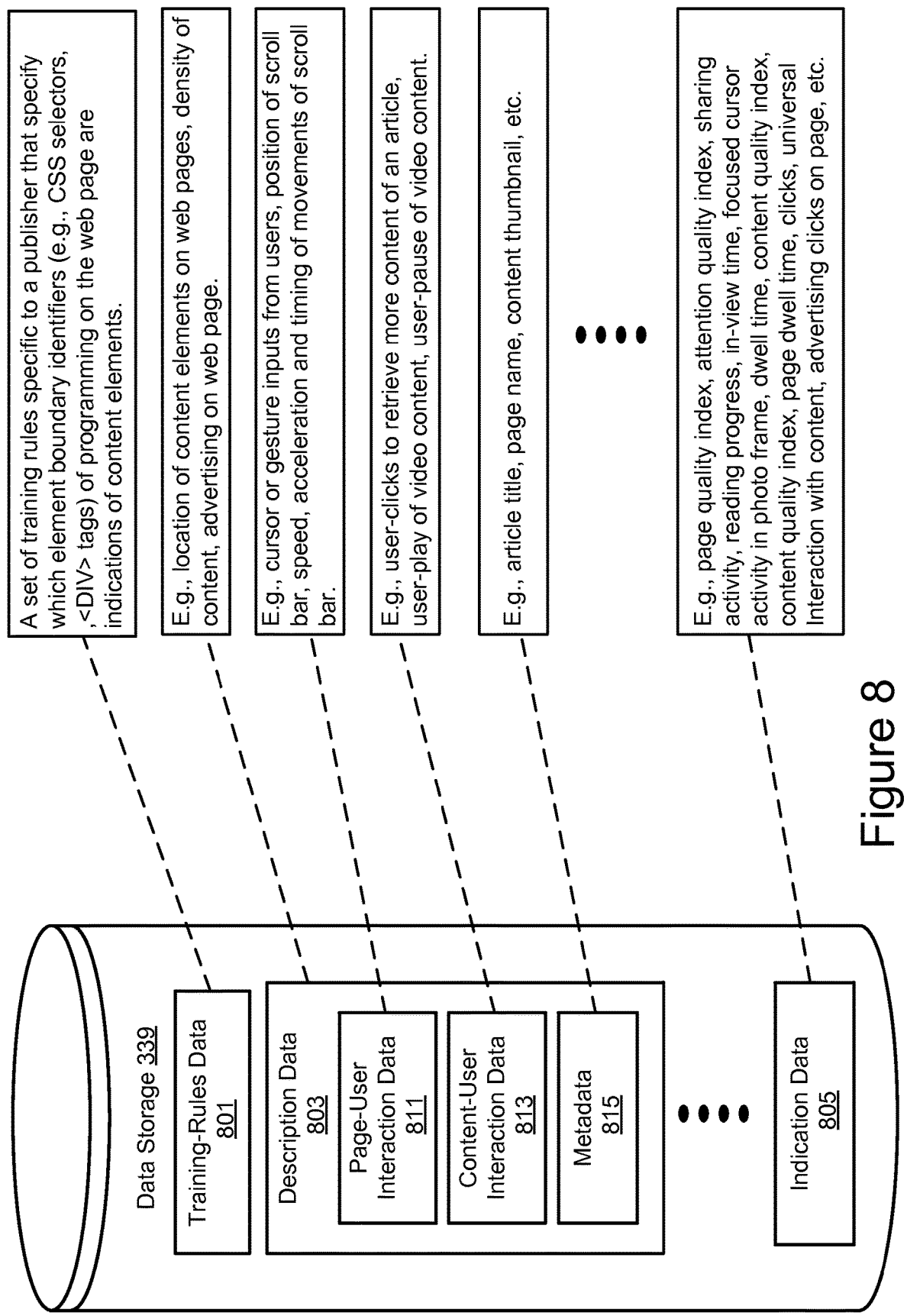
FIG. 8 is a block diagram illustrating one embodiment of data storage in accordance with the present invention.

Referring now to FIG. 8, one embodiment of data storage 339 in accordance with the present invention is shown. The data storage 339 includes data useful for the content-engagement-inference engine 118 to perform its functionality. In the illustrated embodiment, the data storage 339 includes training-rules data 801, description data 803 and indication data 805. The description data 803 includes page-user interaction data 811, content-user interaction data 813 and metadata 815. It should be understood that FIG. 8 shows only one embodiment of the data stored in the data storage 339 according to the present invention. Other data may be used and stored in the data storage 339.

The training-rules data 801 is data describing training rules retrieved from the training rules server 106. The training rules indicate how to detect content on web pages. In some embodiments, the training rules indicate how to detect a certain type of content on web pages. In some embodiments, the training rules indicate how to detect content on web pages published by a certain publisher. In some embodiments, the training rules are specific to a certain type of content on web pages and also specific to a certain publisher. For example, for a certain type of content, e.g., video content, published by a certain publisher, a set of training rules have been created and stored in the training rules server 106. Both of the data collection script 110 and the content-engagement inference engine 118 can retrieve the set of training rules from the training rules server 106 when collecting and analyzing data associated with the certain type of content published by the certain publisher. In one embodiment, the training rules may be created by a publisher specifying which configuration of programming on the web pages are indications of content elements.

The description data 803 is data associated with content elements on web pages. For example, the description data 803 may describe user interactions with the content on web pages. In the illustrated embodiment, the description data 803 includes page-user interaction data 811, content-user interaction data 813 and metadata 815. The page-user interaction data 811 is data describing user interactions with the web pages (i.e., page-user interactions) that includes content elements. For example, the page-user interactions include user dwelling on the web page, movements of the scroll bar of the web page, etc. The content-user interaction data 813 is data describing user interactions with the content elements on the web pages (i.e., content-user interactions). For example, the content-user interactions include clicks-on-play control buttons for a video or movements of a cursor towards a content element, etc. The metadata 815 describes information about content elements and web pages. For example, the metadata 815 includes article titles, a page name, video titles, content thumbnails, etc. In some embodiments, the description data 803 is collected and transmitted by the data collection script 110 and stored in the data storage 339. The analytics engine 118 may retrieves the description data 803 for processing, and based upon the processing of the description data 803, creates analytics results regarding how the content elements have been consumed.

The indication data 805 is data describing indications for which and how content has been consumed by users 125. The indications are generated by the analytics engine 118 by analyzing the description data associated with the content elements on web pages. For example, the analytics engine 118 analyzes user interactions with a content element and metadata associated with the content element to generate indications about if this content element has been consumed by users (e.g., played, viewed) and how this content element was consumed (e.g., briefly read, carefully studied, repeatedly watched, etc.). The indication data 805 can then be used to create an analytics result providing a composite view of what and how content was consumed on web pages.

Systems and methods for determining measurement of on-line content consumption or user engagement with online content have been described. In the above description, for purposes of explanation, numerous specific details were set forth. It will be apparent, however, that the disclosed technologies can be practiced without these specific details. In other instances, structures and devices are shown in block diagram form. For example, the disclosed technologies are described in one embodiment below with reference to user interfaces and particular hardware. Moreover, the technologies are disclosed above primarily in the context of the Internet and on-line advertising; however, the disclosed technologies apply to other types of advertising.

Reference in the specification to "one embodiment" or "an embodiment" means that a particular feature, structure, or characteristic described in connection with the embodiment is included in at least one embodiment of the disclosed technologies. The appearances of the phrase "in one embodiment" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware embodiment, an entirely software embodiment or an embodiment containing both hardware and software elements. In one embodiment, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the embodiments of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present invention can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A processor-based method comprising:
identifying one or more content elements of a web page by:
   retrieving a set of rules specific to a publisher of the web page; and
   applying the set of rules to the web page to detect the one or more content elements;
creating a data collection script according to the set of rules, the data collection script being configured to collect description data relative to the one or more content elements while the web page is rendered by a web browser on a client device of a first user;
transmitting the data collection script to the web browser on the client device, the data collection script configured to be executable by the web browser;
receiving, from the client device, one or more communications transmitted in response to execution of the data collection script by the web browser, wherein the one or more communications comprise the description data collected at the client device, wherein the description data includes interaction data that describes interactions of the first user with the one or more content elements, and wherein the description data further includes metadata that identifies attributes associated with the one or more content elements;
generating indications that the one or more content elements were read, viewed, or otherwise consumed by the first user based on the description data;
generating indications of a level of engagement of the first user with the one or more content elements based on the description data;
learning how various indications correlate with one another to derive conclusions on behavior of the first user directed at the one or more content elements, wherein the learning comprises applying an algorithm to the various indications, and the various indications include the indications that the one or more content elements were read, viewed, or otherwise consumed and the indications of the level of engagement of the first user with the one or more content elements;
analyzing the indications that the one or more content elements were read, viewed, or otherwise consumed, the indications of the level of engagement of the first user with the one or more content elements, and the derived conclusions on the behavior of the first user to estimate: (i) at least one content element of the one or more contents elements was consumed by the first user, and (ii) an extent to which the at least one content element was consumed by the first user; and
transmitting a level of client engagement with the at least one content element to a second user based on the estimate that: (i) the at least one content element of the one or more contents elements was consumed by the first user, and (ii) the extent to which the at least one content element was consumed by the first user.

2. The processor-based method of claim 1, wherein:
the analyzing comprises deriving inferences on the behavior of the first user from the indications that the one or more content elements were read, viewed, or otherwise consumed and the indications of the level of engagement of the first user with the one or more content elements based on the set of rules specific to the publisher;
the set of rules define the inferences on the behavior of the first user based on the interactions of the first user with the one or more content elements; and
the analyzing further comprises estimating (i) the at least one content element of the one or more contents elements was consumed by the first user, and (ii) the extent to which the at least one content element was consumed by the first user based on the derived inferences and the derived conclusions.

3. The processor-based method of claim 2, wherein the set of rules determine the level of client engagement with the at least one content element by determining the first user was engaged at a first level when a cursor activity of a cursor included no movement for a period of time greater than a first threshold over the at least one content element when the at least one content element comprises a video presentation; and
the set of rules determine the level of client engagement with the at least one content element by determining the first user was engaged at a second level when a cursor activity of the cursor included scrolling at a pace greater than a second threshold but slower than a third threshold over the at least one content element when the at least one content element comprises a textual presentation.

4. The processor-based method of claim 3, wherein the set of rules determine the level of client engagement with the one or more content elements by determining the first user was engaged at a third level when a cursor activity of the cursor included clicking on a navigational link embedded in the textual presentation.

5. The processor-based method of claim 1, wherein the set of rules comprises at least a div tag, a content type, a content boundary, a frame definition, or a headline identifier for the one or more content elements.

6. The processor-based method of claim 1, wherein the interactions of the first user with the one or more content elements comprises cursor movement that includes scrolling behavior, scrolling velocity, scrolling direction, clicking on a comment link, clicking on a sharing link, or clicking on a navigational link.

7. The processor-based method of claim 1, wherein the metadata comprises article titles, a page name, video titles, or content thumbnails.

8. A non-transitory computer readable medium storing instructions, which when executed one or more processors, cause the one or more processors to perform operations including:
   identifying one or more content elements of a web page by:
      retrieving a set of rules specific to a publisher of the web page; and
      applying the set of rules to the web page to detect the one or more content elements;
   creating a data collection script according to the set of rules, the data collection script being configured to collect description data relative to the one or more content elements while the web page is rendered by a web browser on a client device of a first user,
   transmitting the data collection script to the web browser on the client device, the data collection script configured to be executable by the web browser;
   receiving, from the client device, one or more communications transmitted in response to execution of the data collection script by the web browser, wherein the one or more communications comprise the description data collected at the client device, wherein the description data includes interaction data that describes interactions of the first user with the one or more content elements, and wherein the description data further includes metadata that identifies attributes associated with the one or more content elements;
   generating indications that the one or more content elements were read, viewed, or otherwise consumed by the first user based on the description data;
   generating indications of a level of engagement of the first user with the one or more content elements based on the description data;
   learning how various indications correlate with one another to derive conclusions on behavior of the first user directed at the one or more content elements, wherein the learning comprises applying an algorithm to the various indications, and the various indications include the indications that the one or more content elements were read, viewed, or otherwise consumed and the indications of the level of engagement of the first user with the one or more content elements;
   analyzing the indications that the one or more content elements were read, viewed, or otherwise consumed, the indications of the level of engagement of the first user with the one or more content elements, and the derived conclusions on the behavior of the first user to estimate: (i) at least one content element of the one or more contents elements was consumed by the first user, and (ii) an extent to which the at least one content element was consumed by the first user; and
   transmitting a level of client engagement with the at least one content element to a second user based on the estimate that: (i) the at least one content element of the one or more contents elements was consumed by the first user, and (ii) the extent to which the at least one content element was consumed by the first user.

9. The non-transitory computer readable medium of claim 8, wherein:
   the analyzing comprises deriving inferences on the behavior of the first user from the indications that the one or more content elements were read, viewed, or otherwise consumed and the indications of the level of engagement of the first user with the one or more content elements based on the set of rules specific to the publisher;
   the set of rules define the inferences on the behavior of the first user based on the interactions of the first user with the one or more content elements; and
   the analyzing further comprises estimating (i) the at least one content element of the one or more contents elements was consumed by the first user, and (ii) the extent to which the at least one content element was consumed by the first user based on the derived inferences and the derived conclusions.

10. The non-transitory computer readable medium of claim 9, wherein the set of rules determine the level of client engagement with the at least one content element by determining the first user was engaged at a first level when a cursor activity of a cursor included no movement for a period of time greater than a first threshold over the at least one content element when the at least one content element comprises a video presentation; and
   the set of rules determine the level of client engagement with the at least one content element by determining the first user was engaged at a second level when a cursor activity of the cursor included scrolling at a pace greater than a second threshold but slower than a third threshold over the at least one content element when the at least one content element comprises a textual presentation.

11. The non-transitory computer readable medium of claim 10, wherein the set of rules determine the level of client engagement with the one or more content elements by determining the first user was engaged at a third level when a cursor activity of the cursor included clicking on a navigational link embedded in the textual presentation.

12. The non-transitory computer readable medium of claim 8, wherein the set of rules comprises at least a div tag, a content type, a content boundary, a frame definition, or a headline identifier for the one or more content elements.

13. The non-transitory computer readable medium of claim 8, wherein the interactions of the first user with the one or more content elements comprises cursor movement that includes scrolling behavior, scrolling velocity, scrolling direction, clicking on a comment link, clicking on a sharing link, or clicking on a navigational link.

14. The non-transitory computer readable medium of claim 8, wherein the metadata comprises article titles, a page name, video titles, or content thumbnails.

15. A system comprising one or more processors to configured for:
   one or more processors; and
   a memory coupled to the one or more processors, the memory storing a plurality of instructions executable by the one or more processors, the plurality of instructions comprising instructions that when executed by the one or more processors cause the one or more processors to perform processing comprising:
   identifying one or more content elements of a web page by:
      retrieving a set of rules specific to a publisher of the web page; and
      applying of the set of rules to the web page to detect the one or more content elements;
   creating a data collection script according to the set of rules, the data collection script being configured to collect description data relative to the one or more content elements while the web page is rendered by a web browser on a client device of a first user;
   transmitting the data collection script to the web browser on the client device, the data collection script configured to be executable by the web browser;

receiving, from the client device, one or more communications transmitted in response to execution of the data collection script by the web browser, wherein the one or more communications comprise the description data collected at the client device, wherein the description data includes interaction data that describes interactions of the first user with the one or more content elements, and wherein the description data further includes metadata that identifies attributes associated with the one or more content elements;

generating indications that the one or more content elements were read, viewed, or otherwise consumed by the first user based on the description data;

generating indications of a level of engagement of the first user with the one or more content elements based on the description data;

learning how various indications correlate with one another to derive conclusions on behavior of the first user directed at the one or more content elements, wherein the learning comprises applying an algorithm to the various indications, and the various indications include the indications that the one or more content elements were read, viewed, or otherwise consumed and the indications of the level of engagement of the first user with the one or more content elements;

analyzing the indications that the one or more content elements were read, viewed, or otherwise consumed, the indications of the level of engagement of the first user with the one or more content elements, and the derived conclusions on the behavior of the first user to estimate: (i) at least one content element of the one or more contents elements was consumed by the first user, and (ii) an extent to which the at least one content element was consumed by the first user; and transmitting a level of client engagement with the at least one content element to a second user based on the estimate that: (i) the at least one content element of the one or more contents elements was consumed by the first user, and (ii) the extent to which the at least one content element was consumed by the first user.

16. The system of claim 15, wherein:

the analyzing comprises deriving inferences on the behavior of the first user from the indications that the one or more content elements were read, viewed, or otherwise consumed and the indications of the level of engagement of the first user with the one or more content elements based on the set of rules specific to the publisher;

the set of rules define the inferences on the behavior of the first user based on the interactions of the first user with the one or more content elements; and the analyzing further comprises estimating (i) the at least one content element of the one or more contents elements was consumed by the first user, and (ii) the extent to which the at least one content element was consumed by the first user based on the derived inferences and the derived conclusions.

17. The system of claim 16, wherein the set of rules determine the level of client engagement with the at least one content element by determining the first user was engaged at a first level when a cursor activity of a cursor included no movement for a period of time greater than a first threshold over the at least one content element when the at least one content element comprises a video presentation; and the set of rules determine the level of client engagement with the at least one content element by determining the first user was engaged at a second level when a cursor activity of the cursor included scrolling at a pace greater than a second threshold but slower than a third threshold over the at least one content element when the at least one content element comprises a textual presentation.

18. The system of claim 17, wherein the set of rules determine the level of client engagement with the one or more content elements by determining the first user was engaged at a third level when a cursor activity of the cursor included clicking on a navigational link embedded in the textual presentation.

19. The system of claim 15, wherein the set of rules comprises at least a div tag, a content type, a content boundary, a frame definition, or a headline identifier for the one or more content elements.

20. The system of claim 15, wherein the interactions of the first user with the one or more content elements comprises cursor movement that includes scrolling behavior, scrolling velocity, scrolling direction, clicking on a comment link, clicking on a sharing link, or clicking on a navigational link.

21. The system of claim 15, wherein the metadata comprises article titles, a page name, video titles, or content thumbnails.

* * * * *